United States Patent
Xu et al.

(10) Patent No.: US 12,159,078 B2
(45) Date of Patent: Dec. 3, 2024

(54) DEVICE INTERACTION METHOD AND ELECTRONIC DEVICE

(71) Applicant: Huawei Technologies Co., Ltd., Shenzhen (CN)

(72) Inventors: Jie Xu, Shanghai (CN); Jiayu Long, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 5 days.

(21) Appl. No.: 18/040,494

(22) PCT Filed: Aug. 4, 2021

(86) PCT No.: PCT/CN2021/110453
§ 371 (c)(1),
(2) Date: Feb. 3, 2023

(87) PCT Pub. No.: WO2022/028447
PCT Pub. Date: Feb. 10, 2022

(65) Prior Publication Data
US 2023/0305789 A1 Sep. 28, 2023

(30) Foreign Application Priority Data
Aug. 5, 2020 (CN) .......................... 202010780044.6

(51) Int. Cl.
*G06F 17/00* (2019.01)
*G06F 3/0486* (2013.01)
(Continued)

(52) U.S. Cl.
CPC .......... *G06F 3/1446* (2013.01); *G06F 3/0486* (2013.01); *G06F 3/147* (2013.01); *H04M 1/72412* (2021.01); *H04W 4/80* (2018.02)

(58) Field of Classification Search
CPC ...... G06F 3/1446; G06F 3/0486; G06F 3/147; G06F 1/1698; G06F 2200/1637;
(Continued)

(56) References Cited

U.S. PATENT DOCUMENTS 9,703,370 B2 * 7/2017 Bukurak .................. G06F 3/01
10,037,183 B2 * 7/2018 Han ...................... G06F 3/0488
(Continued)

FOREIGN PATENT DOCUMENTS

CN 102422623 A 4/2012
CN 102545964 A 7/2012
(Continued)

OTHER PUBLICATIONS

English translation of CN109684491B, published Oct. 23, 2020, pp. 1-140. (Year: 2020).*

*Primary Examiner* — Laurie A Ries
(74) *Attorney, Agent, or Firm* — Slater Matsil, LLP

(57) ABSTRACT

The method is applied to a first electronic device and includes: determining interactive service between the first electronic device and a second electronic device; when the interactive service is a first type, in response to a drag operation on a first object on a first interface of a first application running in the first electronic device, sending data of the first object to the second electronic device to display the first object on a second interface of a second application running in the second electronic device; when the interactive service is a second type, displaying a first subinterface of a third application running in the first electronic device; and sending data of a second subinterface of the third application to the second electronic device to display the second subinterface on the second electronic device.

20 Claims, 33 Drawing Sheets

(51) Int. Cl.
*G06F 3/14* (2006.01)
*G06F 3/147* (2006.01)
*H04M 1/72412* (2021.01)
*H04W 4/80* (2018.01)

(58) Field of Classification Search
CPC .. G06F 1/1626; G06F 1/1694; G06F 3/04883; G06F 3/1454; H04M 1/72412; H04M 1/72454; H04M 2250/16; H04W 4/80; H04W 92/18; H04W 4/023; H04W 64/006; H04W 8/005; H04W 76/14; G09G 2354/00; G09G 2356/00; H04L 67/14
See application file for complete search history.

(56) References Cited

U.S. PATENT DOCUMENTS

| | | | |
|---|---|---|---|
| 10,394,331 B2* | 8/2019 | Gardenfors | H04W 4/027 |
| 10,725,809 B2* | 7/2020 | Shan | G06F 3/0481 |
| 2011/0081923 A1 | 4/2011 | Forutanpour et al. | |
| 2012/0274661 A1* | 11/2012 | Ye | G06F 3/0481 |
| | | | 345/629 |
| 2014/0188989 A1 | 7/2014 | Stekkelpak et al. | |
| 2014/0240216 A1* | 8/2014 | Bukurak | G06F 3/1454 |
| | | | 345/156 |
| 2014/0320387 A1* | 10/2014 | Eriksson | G06F 3/017 |
| | | | 345/156 |
| 2015/0147969 A1* | 5/2015 | Wei | H04W 4/80 |
| | | | 455/41.2 |
| 2015/0185823 A1* | 7/2015 | Jiang | G06F 3/01 |
| | | | 345/156 |
| 2015/0350312 A1* | 12/2015 | Lin | H04L 67/104 |
| | | | 709/201 |
| 2016/0351171 A1 | 12/2016 | Xu | |
| 2020/0380901 A1* | 12/2020 | Ryu | G09G 3/20 |
| 2023/0021994 A1* | 1/2023 | Gu | G06F 3/1454 |

FOREIGN PATENT DOCUMENTS

| | | | | |
|---|---|---|---|---|
| CN | 104104899 A | 10/2014 | | |
| CN | 104536580 A | 4/2015 | | |
| CN | 105007563 A | 10/2015 | | |
| CN | 106303067 A | 1/2017 | | |
| CN | 109684491 A | 4/2019 | | |
| CN | 110597473 A | 12/2019 | | |
| CN | 110719584 A | * 1/2020 | | G06F 3/04883 |
| CN | 110798568 A | 2/2020 | | |
| CN | 110958475 A | 4/2020 | | |
| CN | 111371864 A | * 7/2020 | | |
| CN | 109684491 B | * 10/2020 | | G06F 16/178 |
| WO | 2004075169 A2 | 9/2004 | | |
| WO | WO-2013123597 A1 | * 8/2013 | | G06F 1/1654 |
| WO | WO-2014129810 A1 | * 8/2014 | | G06F 13/14 |
| WO | WO-2019235810 A1 | * 12/2019 | | G16Y 40/35 |

* cited by examiner

DEVICE INTERACTION METHOD AND ELECTRONIC DEVICE

CROSS-REFERENCE TO RELATED APPLICATIONS

This application is a national stage of International Application No. PCT/CN2021/110453, filed on Aug. 4, 2021, which claims priority to Chinese Patent Application No. 202010780044.6, filed Aug. 5, 2020. Both of the aforementioned applications are hereby incorporated by reference in their entireties.

TECHNICAL FIELD

This application relates to the field of terminal technologies, and in particular, to a device interaction method and an electronic device.

BACKGROUND

With development of intelligent terminal technologies, functions of electronic devices are becoming more powerful, and there are more scenarios in which electronic devices need to interact with each other. In a process of using electronic devices, data on an electronic device often needs to be switched to another electronic device for display, or a function in an electronic device needs to be extended to another electronic device.

Currently, a manner of implementing such cross-device interaction may be setting near field communication (near field communication, NFC) tags in electronic devices. When data exchange or function extension needs to be implemented between two or more electronic devices, a corresponding service is started by using NFC tags. For example, an NFC tag of a first electronic device comes into contact with an NFC tag of a second electronic device. In this case, a trust relationship may be established between the first electronic device and the second electronic device. Then, the first electronic device may transmit a first file to the second electronic device for display, or some functions of the first electronic device may be extended to the second electronic device for implementation.

In the foregoing manner, a data transmission or function extension service is started between electronic devices through contact between NFC tags. Although the implementation is convenient, the electronic devices are required to have NFC functions.

SUMMARY

Embodiments of this application provide a device interaction method and an electronic device, to trigger interaction between electronic devices based on different contact postures of the electronic devices.

According to a first aspect, an embodiment of this application provides a device interaction method, where the method is applied to a first electronic device and includes:
  obtaining a relative location of a second electronic device;
  determining an approach direction of the second electronic device based on the relative location;
  obtaining first posture data of the first electronic device and second posture data of the second electronic device;
  determining a contact posture between the first electronic device and the second electronic device based on the approach direction, the first posture data, and the second posture data; and
  determining the second electronic device as an extension device of the first electronic device based on the contact posture.

In this embodiment of this application, when the second electronic device approaches the first electronic device, the first electronic device obtains the relative location of the second electronic device. The first electronic device determines the approach direction of the second electronic device based on the relative location. Further, the first electronic device determines the contact posture between the first electronic device and the second electronic device based on the posture data of the first electronic device and the second electronic device. The first electronic device may determine the second electronic device as the extension device based on the contact posture. Therefore, operations such as data transmission, display screen extension, input function extension, and operation region extension may be performed on the second electronic device. It can be learned that, according to the solution of this embodiment of this application, electronic devices can interact with each other based on different contact postures of the electronic devices.

With reference to the first aspect, in some implementations of the first aspect, the obtaining a relative location of a second electronic device includes:
  detecting location data of the first electronic device or the second electronic device by using an ultra-wideband (Ultra-wideband, UWB) positioning chip or a Bluetooth positioning chip; and
  determining the relative location of the second electronic device based on the location data.

With reference to the first aspect, in some implementations of the first aspect, the obtaining first posture data of the first electronic device includes any one or a combination of the following manners:
  detecting motion posture data of the first electronic device by using a gyro sensor; and
  detecting acceleration data of the first electronic device by using an acceleration sensor.

With reference to the first aspect, in some implementations of the first aspect, the obtaining second posture data of the second electronic device includes:
  receiving the second posture data sent by the second electronic device, where
  the second posture data includes motion posture data, acceleration data, or landscape/portrait orientation status data of the second electronic device.

With reference to the first aspect, in some implementations of the first aspect, the first posture data includes a first contact signal and the second posture data includes a second contact signal; and
  the determining a contact posture between the first electronic device and the second electronic device based on the approach direction, the first posture data, and the second posture data includes:
  determining, based on the first contact signal and the second contact signal, sides or surfaces on which the first electronic device is in contact with the second electronic device.

With reference to the first aspect, in some implementations of the first aspect, the first posture data includes first acceleration data; and
  correspondingly, the method further includes: based on the first acceleration data, determining a landscape/portrait orientation status of the first electronic device, determining a speed at which the first electronic device moves toward the second electronic device, or determining a tilt angle of the first electronic device.

With reference to the first aspect, in some implementations of the first aspect, the second posture data includes second acceleration data or landscape/portrait orientation status data; and correspondingly, the method further includes: determining a landscape/portrait orientation status of the second electronic device based on the second acceleration data or the landscape/portrait orientation status data; or determining a speed at which the second electronic device moves toward the first electronic device or a tilt angle of the second electronic device based on the second acceleration data.

With reference to the first aspect, in some implementations of the first aspect, the contact posture between the first electronic device and the second electronic device includes any one of the following:

a first long side of the first electronic device is in contact with a second long side of the second electronic device;

the first long side of the first electronic device is in contact with a first short side of the second electronic device;

a second short side of the first electronic device is in contact with a third long side of the second electronic device;

the second short side of the first electronic device is in contact with a third short side of the second electronic device;

a first surface of the first electronic device is in contact with a second surface of the second electronic device; and a preset side or surface of the second electronic device is in contact with an accessory of the first electronic device.

With reference to the first aspect, in some implementations of the first aspect, a contact direction of the contact posture includes:

the first electronic device and the second electronic device come into contact with each other after moving toward each other.

With reference to the first aspect, in some implementations of the first aspect, the determining the second electronic device as an extension device of the first electronic device based on the contact posture includes:

if the first electronic device and the second electronic device are devices of a same type, when the first electronic device proactively comes into contact with the second electronic device, determining the first electronic device as a primary device, and determining the second electronic device that is passively in contact as the extension device; or when the second electronic device proactively comes into contact with the first electronic device, determining the first electronic device as a primary device, and determining the second electronic device that proactively comes into contact as the extension device.

With reference to the first aspect, in some implementations of the first aspect, the method further includes:

if the first electronic device and the second electronic device come into contact with each other after moving toward each other, displaying first prompt information on the first electronic device, where the first prompt information is used to prompt a user to determine the primary device from the first device or the second device.

With reference to the first aspect, in some implementations of the first aspect, the method further includes:

if the first electronic device and the second electronic device are devices of different types, when the first electronic device is a device of a preset type, determining the first electronic device as the primary device, and determining the second electronic device as the extension device.

With reference to the first aspect, in some implementations of the first aspect, after the determining the second electronic device as an extension device of the first electronic device, the method further includes:

determining display screens of the first electronic device and the second electronic device as a combined screen based on display screen information of the first electronic device and the second electronic device; and sending first data on the first electronic device to the second electronic device based on the combined screen; or displaying the first data on the combined screen; or determining a region of the combined screen as an operation region.

With reference to the first aspect, in some implementations of the first aspect, the sending first data on the first electronic device to the second electronic device based on the combined screen includes:

detecting a first gesture motion performed on the first data;

displaying a movement track of the first data on the combined screen based on the first gesture motion; and transmitting the first data from the first electronic device to the second electronic device based on the first gesture motion.

With reference to the first aspect, in some implementations of the first aspect, the displaying the first data on the combined screen includes:

detecting a second gesture motion or detecting a third gesture motion; receiving fourth gesture motion data sent by the second electronic device; determining a fourth gesture motion based on the fourth gesture motion data; and if a combined motion of the third gesture motion and the fourth gesture motion is a specified motion, determining to display the first data on the combined screen.

With reference to the first aspect, in some implementations of the first aspect, the method further includes:

displaying a thumbnail of the first data on the display screen of the first electronic device or the combined screen based on the second gesture motion or the combined motion.

With reference to the first aspect, in some implementations of the first aspect, the first data is a user interface displayed on the first electronic device; and the displaying the first data on the combined screen includes:

dividing the user interface into a first subinterface and a second subinterface; and displaying the first subinterface on the display screen of the first electronic device; and sending data of the second subinterface to the second electronic device to display the second subinterface on the second electronic device.

With reference to the first aspect, in some implementations of the first aspect, the first electronic device displays the first user interface; and the displaying the first data on the combined screen includes:

detecting a first operation performed on a first control on the first user interface; and sending, to the second electronic device in response to the first operation, indication information for displaying a second control or displaying a first subinterface.

With reference to the first aspect, in some implementations of the first aspect, the determining a region of the combined screen as an operation region includes:

detecting a first input instruction, and determining that the first input instruction is performed on a region in which the display screen of the second electronic device is located;

sending a second input instruction to the second electronic device based on the first input instruction, so that the second electronic device responds based on the second input instruction; and receiving a response result that is generated by the second electronic device based on the second input instruction.

According to a second aspect, an embodiment of this application provides an electronic device, where the device is a first electronic device and includes:

a microphone, one or more processors, a memory, and one or more computer programs, where the one or more computer programs are stored in the memory, the one or more computer programs include instructions, and when the instructions are executed by the electronic device, the electronic device is enabled to perform the following steps:

obtaining a relative location of a second electronic device;

determining an approach direction of the second electronic device based on the relative location;

obtaining first posture data of the first electronic device and second posture data of the second electronic device;

determining a contact posture between the first electronic device and the second electronic device based on the approach direction, the first posture data, and the second posture data; and determining the second electronic device as an extension device of the first electronic device based on the contact posture.

With reference to the second aspect, in some implementations of the second aspect, when the instructions are executed by the device, the device is enabled to specifically perform the following steps:

detecting location data of the first electronic device or the second electronic device by using a UWB positioning chip or a Bluetooth positioning chip; and determining the relative location of the second electronic device based on the location data.

With reference to the second aspect, in some implementations of the second aspect, when the instructions are executed by the device, the device is enabled to specifically perform the following steps:

detecting motion posture data of the first electronic device by using a gyro sensor; and detecting acceleration data of the first electronic device by using an acceleration sensor.

With reference to the second aspect, in some implementations of the second aspect, when the instructions are executed by the device, the device is enabled to specifically perform the following steps:

receiving the second posture data sent by the second electronic device, where the second posture data includes motion posture data, acceleration data, or landscape/portrait orientation status data of the second electronic device.

With reference to the second aspect, in some implementations of the second aspect, the first posture data includes a first contact signal and the second posture data includes a second contact signal; and when the instructions are executed by the device, the device is enabled to specifically perform the following steps:

determining, based on the first contact signal and the second contact signal, sides or surfaces on which the first electronic device is in contact with the second electronic device.

With reference to the second aspect, in some implementations of the second aspect, the first posture data includes first acceleration data; and correspondingly, when the instructions are executed by the device, the device is enabled to specifically perform the following steps:

based on the first acceleration data, determining a landscape/portrait orientation status of the first electronic device, determining a speed at which the first electronic device moves toward the second electronic device, or determining a tilt angle of the first electronic device.

With reference to the second aspect, in some implementations of the second aspect, the second posture data includes second acceleration data or landscape/portrait orientation status data; and correspondingly, when the instructions are executed by the device, the device is enabled to specifically perform the following steps:

determining a landscape/portrait orientation status of the second electronic device based on the second acceleration data or the landscape/portrait orientation status data; or determining a speed at which the second electronic device moves toward the first electronic device or a tilt angle of the second electronic device based on the second acceleration data.

With reference to the second aspect, in some implementations of the second aspect, the contact posture between the first electronic device and the second electronic device includes any one of the following:

a first long side of the first electronic device is in contact with a second long side of the second electronic device;

the first long side of the first electronic device is in contact with a first short side of the second electronic device;

a second short side of the first electronic device is in contact with a third long side of the second electronic device;

the second short side of the first electronic device is in contact with a third short side of the second electronic device;

a first surface of the first electronic device is in contact with a second surface of the second electronic device; and a preset side or surface of the second electronic device is in contact with an accessory of the first electronic device.

With reference to the second aspect, in some implementations of the second aspect, a contact direction of the contact posture includes:

the first electronic device and the second electronic device come into contact with each other after moving toward each other.

With reference to the second aspect, in some implementations of the second aspect, when the instructions are executed by the device, the device is enabled to specifically perform the following steps:

if the first electronic device and the second electronic device are devices of a same type, when the first electronic device proactively comes into contact with the second electronic device, determining the first electronic device as a primary device, and determining the second electronic device that is passively in contact as the extension device; or when the second electronic device proactively comes into contact with the first electronic device, determining the first electronic device as a primary device, and determining the second electronic device that proactively comes into contact as the extension device.

With reference to the second aspect, in some implementations of the second aspect, when the instructions are executed by the device, the device is enabled to specifically perform the following steps:

if the first electronic device and the second electronic device come into contact with each other after moving toward each other, displaying first prompt information on the first electronic device, where the first prompt information is used to prompt a user to determine the primary device from the first device or the second device.

With reference to the second aspect, in some implementations of the second aspect, when the instructions are executed by the device, the device is enabled to specifically perform the following steps:

if the first electronic device and the second electronic device are devices of different types, when the first electronic device is a device of a preset type, determining the first electronic device as the primary device, and determining the second electronic device as the extension device.

With reference to the second aspect, in some implementations of the second aspect, when the instructions are executed by the device, the device is enabled to specifically perform the following steps:

determining display screens of the first electronic device and the second electronic device as a combined screen based on display screen information of the first electronic device and the second electronic device; and sending first data on the first electronic device to the second electronic device based on the combined screen; or displaying the first data on the combined screen; or determining a region of the combined screen as an operation region.

With reference to the second aspect, in some implementations of the second aspect, when the instructions are executed by the device, the device is enabled to specifically perform the following steps:

detecting a first gesture motion performed on the first data;

displaying a movement track of the first data on the combined screen based on the first gesture motion; and transmitting the first data from the first electronic device to the second electronic device based on the first gesture motion.

With reference to the second aspect, in some implementations of the second aspect, when the instructions are executed by the device, the device is enabled to specifically perform the following steps:

detecting a second gesture motion or detecting a third gesture motion; receiving fourth gesture motion data sent by the second electronic device; determining a fourth gesture motion based on the fourth gesture motion data; and if a combined motion of the third gesture motion and the fourth gesture motion is a specified motion, determining to display the first data on the combined screen.

With reference to the second aspect, in some implementations of the second aspect, when the instructions are executed by the device, the device is enabled to specifically perform the following steps:

displaying a thumbnail of the first data on the display screen of the first electronic device or the combined screen based on the second gesture motion or the combined motion.

With reference to the second aspect, in some implementations of the second aspect, the first data is a user interface displayed on the first electronic device; and when the instructions are executed by the device, the device is enabled to specifically perform the following steps:

dividing the user interface into a first subinterface and a second subinterface;

displaying the first subinterface on the display screen of the first electronic device; and sending data of the second subinterface to the second electronic device to display the second subinterface on the second electronic device.

With reference to the second aspect, in some implementations of the second aspect, the first electronic device displays the first user interface; and when the instructions are executed by the device, the device is enabled to specifically perform the following steps:

detecting a first operation performed on a first control on the first user interface; and sending, to the second electronic device in response to the first operation, indication information for displaying a second control or displaying a first subinterface.

With reference to the second aspect, in some implementations of the second aspect, when the instructions are executed by the device, the device is enabled to specifically perform the following steps:

detecting a first input instruction, and determining that the first input instruction is performed on a region in which the display screen of the second electronic device is located;

sending a second input instruction to the second electronic device based on the first input instruction, so that the second electronic device responds based on the second input instruction; and receiving a response result that is generated by the second electronic device based on the second input instruction.

According to a third aspect, an embodiment of this application provides an electronic device. The device includes a storage medium and a central processing unit, the storage medium may be a nonvolatile storage medium, and the storage medium stores a computer executable program. The central processing unit is connected to the nonvolatile storage medium, and executes the computer executable program, to implement the method according to any one of the first aspect or the possible implementations of the first aspect.

According to a fourth aspect, this technical solution provides a chip. The chip includes a processor and a data interface, and the processor reads, by using the data interface, instructions stored in a memory, to perform the method according to any one of the first aspect or the possible implementations of the first aspect.

Optionally, in an implementation, the chip may further include a memory. The memory stores instructions, and the processor is configured to execute the instructions stored in the memory. When the instructions are executed, the processor is configured to perform the method according to any one of the first aspect or the possible implementations of the first aspect.

According to a fifth aspect, this technical solution provides a computer-readable storage medium. The computer-readable medium stores program code for execution by a device, and the program code includes instructions used to perform the method according to any one of the first aspect or the possible implementations of the first aspect.

DETAILED DESCRIPTION OF ILLUSTRATIVE EMBODIMENTS

The following describes technical solutions of this application with reference to the accompanying drawings.

Figure 1:
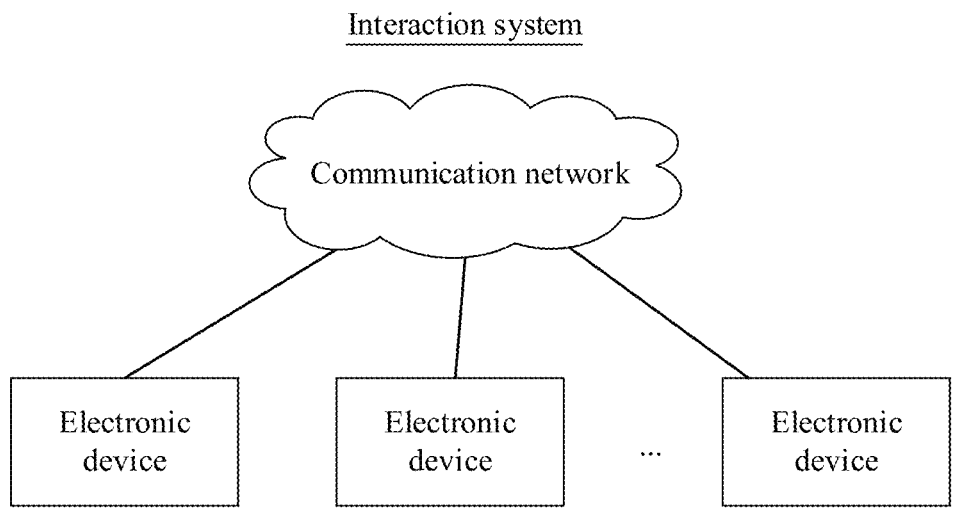
FIG. 1 is a schematic diagram of a structure of a device interaction system according to an embodiment of this application.

A device interaction method provided in embodiments of this application can be applied to a system shown in FIG. 1. As shown in FIG. 1, the system includes a plurality of electronic devices. The plurality of electronic devices may be a mobile phone, a tablet computer, a computer, a wearable device, a vehicle-mounted device, a smart household device, an augmented reality (augmented reality, AR)/virtual reality (virtual reality, VR) device, and the like. The plurality of electronic devices may be interconnected through a communication network. For example, the communication network may be a wired network or a wireless network. For example, the communication network may be a local area network (Local Area Network, LAN) or a wide area network (Wide Area Network, WAN). The communication network may be implemented by using any known network communication protocol, and the network communication protocols may be various wired or wireless communication protocols. For example, a Wi-Fi connection may be established between electronic devices in the system shown in FIG. 1 by using a Wi-Fi protocol. Alternatively, electronic devices in the system shown in FIG. 1 may be interconnected through one or more servers after logging in to a same account. Specifically, electronic devices in the system shown in FIG. 1 may establish a connection to each other by using a technology such as Bluetooth (Bluetooth, BT), a wireless local area network (wireless local area network, WLAN) (for example, a wireless fidelity (wireless fidelity, Wi-Fi) network), or near field communication (near field communication, NFC). After establishing the connection, the electronic devices may perform data transmission by using a technology such as BT, Wi-Fi, or NFC. It should be noted that a technology for establishing a connection between electronic devices may be the same as or different from a technology for data transmission between the electronic devices.

For example, the communication system includes a first electronic device and a second electronic device. The first electronic device displays a user interface of a first application program, and the second electronic device displays a user interface of a second application program. For example, the first electronic device displays a user interface of a gallery application program, and the second electronic device displays a chat interface of an instant messaging application program. The first electronic device may send image data in the gallery to the second electronic device. The second electronic device enters the received image data into the chat interface for display.

There are a plurality of manners of triggering the first electronic device to send the image data to the second electronic device. For example, when reading the NFC tag information of the second electronic device, the first electronic device sends the image data to the second electronic device. Different from triggering data transmission between devices by using NFC tags, an embodiment of this application provides a method for determining an interactive service between devices based on a relative location posture between the devices. The interactive service between the devices that is determined based on the relative location posture between the devices may be: cross-device data transmission, display screen extension, function extension, operation region extension, or the like.

In this embodiment of this application, a manner of determining a relative location posture between devices may be: The first electronic device discovers the second electronic device; and the first electronic device determines a relative location posture between the first electronic device and the second electronic device based on approach directions of the first electronic device and the second electronic device and posture data of the first electronic device and the second electronic device.

That the first electronic device discovers the second electronic device may be: The first electronic device performs ranging on electronic devices in surrounding space; and the first electronic device uses electronic devices within a first distance range as discovery devices. Alternatively, the first electronic device obtains electronic devices connected to a same network as the first electronic device, for example, the first electronic device obtains electronic devices connected to a same Wi-Fi network as the first electronic device; and the first electronic device uses the electronic devices connected to the Wi-Fi network as discovery devices. Alternatively, the first electronic device enables a Bluetooth function, and the first electronic device uses electronic devices that enable Bluetooth as discovery devices. Alternatively, the first electronic device determines, by using an optical proximity sensor or the like, devices close to the first electronic device, and determines the devices close to the first electronic device as discovery devices. After determining the discovery devices, the first electronic device may determine the second electronic device from the discovery devices based on a selection operation of a user or a relative distance between devices.

In this embodiment of this application, a manner in which the first electronic device obtains relative locations of the first electronic device and the second electronic device may include: The first electronic device and the second electronic device determine a distance between the first electronic device and the second electronic device and orientations of the first electronic device and the second electronic device by using a wireless positioning technology. The wireless positioning may be a positioning technology such as GPS, UWB, Wi-Fi, or Bluetooth.

In some embodiments, the first electronic device sends a first positioning signal to the second electronic device. After receiving the first positioning signal, the second electronic device sends a second positioning signal to the second electronic device. The first electronic device determines the distance to the second electronic device and the orientations of the first electronic device and the second electronic device based on the first positioning signal and the second positioning signal. After determining the distance to the first electronic device and the orientations of the first electronic device and the second electronic device, the first electronic device may determine the approach direction of the second electronic device.

In some other embodiments, an auxiliary device capable of transmitting/receiving a positioning signal is disposed in space in which the first electronic device and the second electronic device are located. The first electronic device and the second electronic device respectively determine absolute location information of the first electronic device and the second electronic device by using the auxiliary device, where the absolute location information may be three-degrees-of-freedom location information, six-degrees-of-freedom information, or the like. The first electronic device determines the distance to the second electronic device and the orientations of the first electronic device and the second electronic device based on the absolute location information of the first electronic device and the second electronic device. The first electronic device may determine the approach direction of the second electronic device based on the distance to the second electronic device and the orientations of the first electronic device and the second electronic device.

Further, in addition to obtaining the distance between the first electronic device and the second electronic device and the orientations of the first electronic device and the second electronic device, the first electronic device may further obtain the posture data of the first electronic device and the second electronic device, such as acceleration, tilt angles, contact signals, or landscape/portrait orientation statuses. On a basis of determining the approach direction of the second electronic device, the first electronic device may further determine the relative location posture between the first electronic device and the second electronic device based on the posture data of the first electronic device and the second electronic device. Optionally, the relative location posture may also be referred to as an approach posture or a contact posture between the first electronic device and the second electronic device.

In some embodiments, a relative location posture between devices may be: A distance between given sidewalls or given surfaces of two devices is less than a threshold, given sidewalls or given surfaces of two devices come into contact with each other at a specific angle, or the like. The following describes a relative location posture between devices by using specific examples.

Figure 2A:
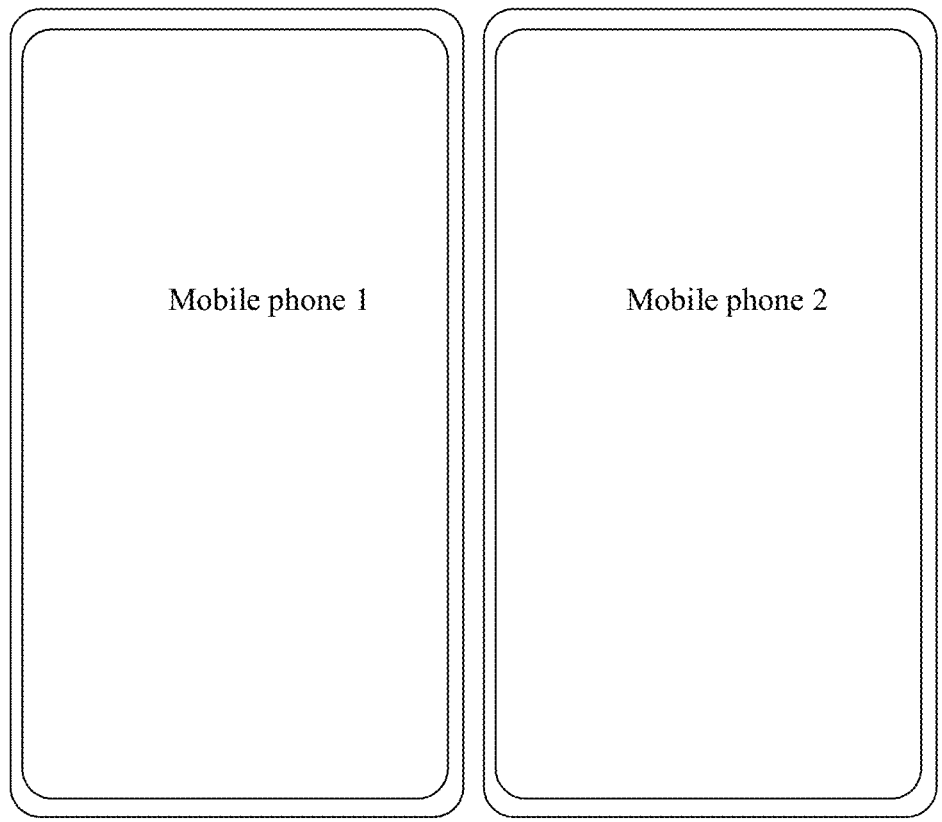
FIG. 2A to FIG. 2D are schematic diagrams of relative location postures between devices according to an embodiment of this application.

In some embodiments, as shown in FIG. 2A to FIG. 2D, the first electronic device is a mobile phone 1, and the second electronic device is a mobile phone 2. Because a mobile phone is generally a cuboid, for ease of description, a long sidewall of the mobile phone is referred to as a long side and a short sidewall of the mobile phone is referred to as a short side in this embodiment of this application. Details are as follows:

As shown in FIG. 2A, a relative location posture between the mobile phone 1 and the mobile phone 2 may be: A distance between a long side of the mobile phone 1 and a long side of the mobile phone 2 is less than a first threshold. Specifically, the long side of the mobile phone 1 moves close to the long side of the mobile phone 2, so that the distance between the long side of the mobile phone 1 and the long side of the mobile phone 2 is less than the first threshold; the long side of the mobile phone 2 moves close to the long side of the mobile phone 1, so that the distance between the long side of the mobile phone 1 and the long side of the mobile phone 2 is less than the first threshold; or the long side of the mobile phone 1 and the long side of the mobile phone 2 move close to each other, so that the distance between the long side of the mobile phone 1 and the long side of the mobile phone 2 is less than the first threshold. More specifically, each of the mobile phone 1 and the mobile phone 2 includes two long sides. When the relative location posture between the mobile phone 1 and the mobile phone 2 is being determined, the long sides may be further distinguished between each other. For example, the mobile phone 1 includes a first long side and a second long side, and the mobile phone 2 includes a third long side and a fourth long side. In this case, postures in which the distance between the long sides of the mobile phone 1 and the mobile phone 2 is less than the first threshold may be further divided as follows: A distance between the first long side of the mobile phone 1 and the third long side of the mobile phone 2 is less than the first threshold; a distance between the first long side of the mobile phone 1 and the fourth long side of the mobile phone 2 is less than the first threshold; a distance between the second long side of the mobile phone 1 and the third long side of the mobile phone 2 is less than the first threshold; and a distance between the second long side of the mobile phone 1 and the fourth long side of the mobile phone 2 is less than the first threshold. Certainly, when the posture between the mobile phone 1 and the mobile phone 2 is determined by distinguishing between the long sides, a moving approach direction of the devices may be further considered. Details are not described herein.

Still using FIG. 2A as an example, the relative location posture between the mobile phone 1 and the mobile phone 2 may be: A long side of the mobile phone 1 and a long side of the mobile phone 2 come into contact with each other in a first posture. Specifically, the long side of the mobile phone 1 moves close to the long side of the mobile phone 2, and the long side of the mobile phone 1 comes into contact with the long side of the mobile phone 2; the long side of the mobile phone 2 moves close to the long side of the mobile phone 1, and the long side of the mobile phone 2 comes into contact with the long side of the mobile phone 1; or the long side of the mobile phone 1 and the long side of the mobile phone 2 move close to each other, and the long side of the mobile phone 1 and the long side of the mobile phone 2 come into contact with each other. More specifically, when the contact posture between the mobile phone 1 and the mobile phone 2 is being determined, the long sides and the short sides may be further distinguished between each other. For a distinguishing manner, refer to the description in FIG. 2A. Details are not described by using examples one by one herein.

Figure 2B:
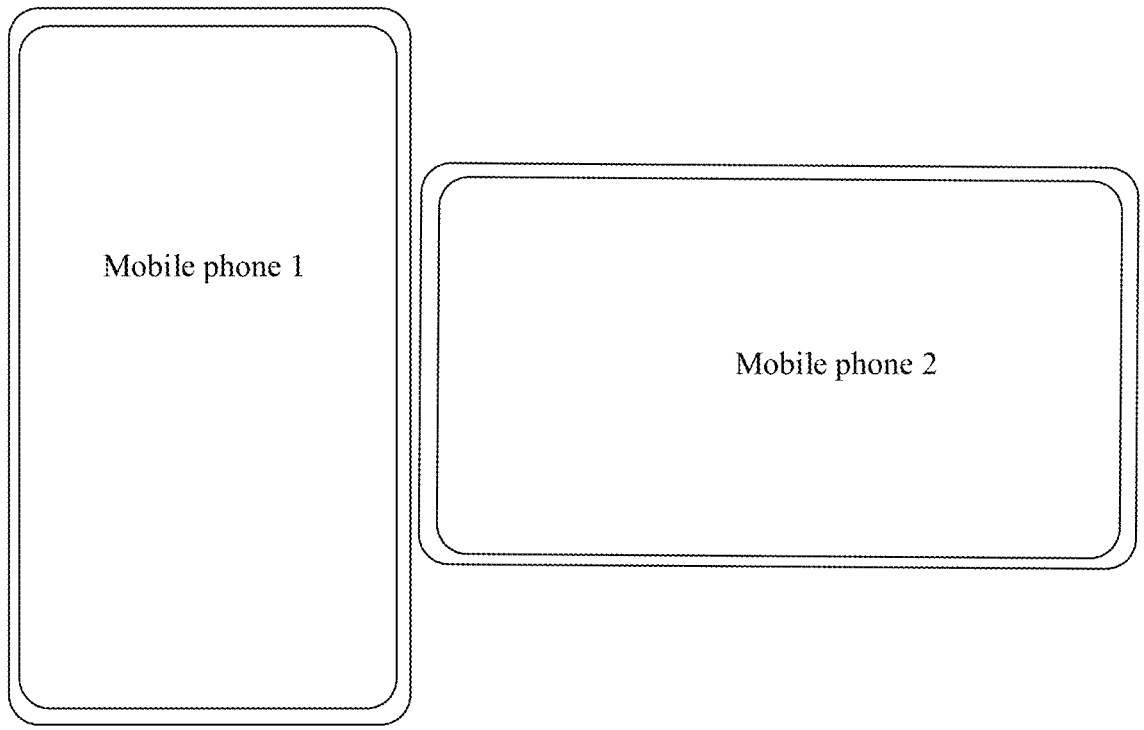

As shown in FIG. 2B, a relative location posture between the mobile phone 1 and the mobile phone 2 may be: A distance between a long side of the mobile phone 1 and a short side of the mobile phone 2 is less than a second threshold. Specifically, the long side of the mobile phone 1 moves close to the short side of the mobile phone 2, so that the distance between the long side of the mobile phone 1 and the short side of the mobile phone 2 is less than the second threshold; the short side of the mobile phone 2 moves close to the long side of the mobile phone 1, so that the distance between the long side of the mobile phone 1 and the short side of the mobile phone 2 is less than the second threshold; or the long side of the mobile phone 1 and the short side of the mobile phone 2 move close to each other, so that the distance between the long side of the mobile phone 1 and the short side of the mobile phone 2 is less than the second threshold. Certainly, when the relative location posture between the mobile phone 1 and the mobile phone 2 is being determined, the long sides and the short sides may be distinguished between each other. For a distinguishing manner, refer to the description in FIG. 2A. Details are not described by using examples one by one herein.

Still using FIG. 2B as an example, the relative location posture between the mobile phone 1 and the mobile phone 2 may be: A long side of the mobile phone 1 and a short side of the mobile phone 2 come into contact with each other in a second posture. Specifically, the long side of the mobile phone 1 moves close to the short side of the mobile phone 2, and the long side of the mobile phone 1 comes into contact with the short side of the mobile phone 2; the short side of the mobile phone 2 moves close to the long side of the mobile phone 1, and the short side of the mobile phone 2 comes into contact with the long side of the mobile phone 1; or the long side of the mobile phone 1 and the short side of the mobile phone 2 move close to each other, and the long side of the mobile phone 1 comes into contact with the short side of the mobile phone 2. Certainly, when the relative location posture between the mobile phone 1 and the mobile phone 2 is being determined, the long sides and the short sides may be distinguished between each other. For a distinguishing manner, refer to the description in FIG. 2A. Details are not described by using examples one by one herein.

Figure 2C:
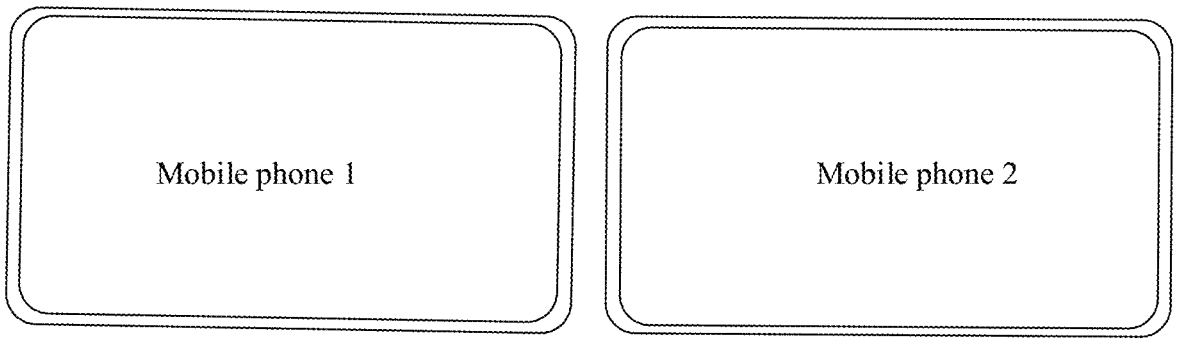

As shown in FIG. 2C, a relative location posture between the mobile phone 1 and the mobile phone 2 may be: A distance between a short side of the mobile phone 1 and a short side of the mobile phone 2 is less than a third threshold. Specifically, the short side of the mobile phone 1 moves close to the short side of the mobile phone 2, so that the distance between the short side of the mobile phone 1 and the short side of the mobile phone 2 is less than the third threshold; the short side of the mobile phone 2 moves close to the short side of the mobile phone 1, so that the distance between the short side of the mobile phone 1 and the short side of the mobile phone 2 is less than the third threshold; or the short side of the mobile phone 1 and the short side of the mobile phone 2 move close to each other, so that the distance between the short side of the mobile phone 1 and the short side of the mobile phone 2 is less than the third threshold. Certainly, when the relative location posture between the mobile phone 1 and the mobile phone 2 is being determined, the short sides may be distinguished between each other. For a distinguishing manner, refer to the description in FIG. 2A. Details are not described by using examples one by one herein.

Still using FIG. 2C as an example, the relative location posture between the mobile phone 1 and the mobile phone 2 may be: A short side of the mobile phone 1 and a short side of the mobile phone 2 come into contact with each other in a third posture. Specifically, the short side of the mobile phone 1 moves close to the short side of the mobile phone 2, and the short side of the mobile phone 1 comes into contact with the short side of the mobile phone 2; the short side of the mobile phone 2 moves close to the short side of the mobile phone 1, and the short side of the mobile phone 2 comes into contact with the short side of the mobile phone 1; or the short side of the mobile phone 1 and the short side of the mobile phone 2 move close to each other, and the short side of the mobile phone 1 comes into contact with the short side of the mobile phone 2. Certainly, when the relative location posture between the mobile phone 1 and the mobile phone 2 is being determined, the short sides may be distinguished between each other. For a distinguishing manner, refer to the description in FIG. 2A. Details are not described by using examples one by one herein.

Figure 2D:
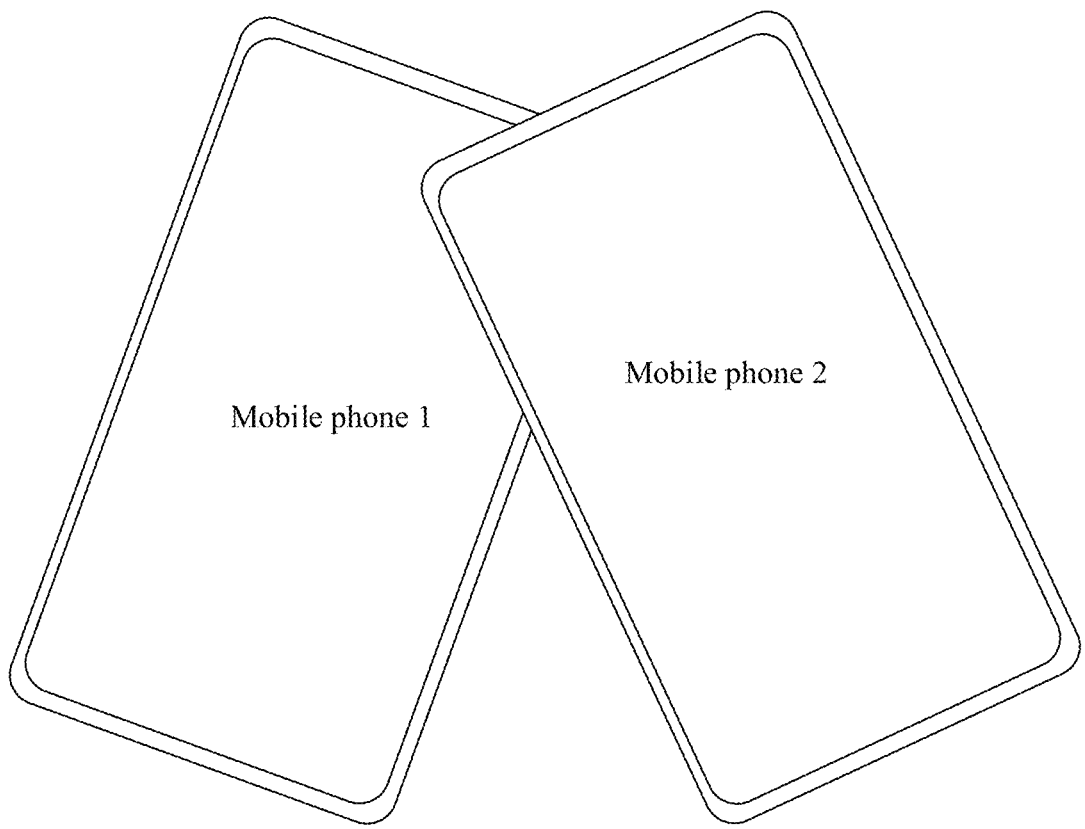

As shown in FIG. 2D, a relative location posture between the mobile phone 1 and the mobile phone 2 may be: One surface of the mobile phone 1 and one surface of the mobile phone 2 are stacked. For example, a surface of a display screen of the mobile phone 1 and a surface of a display screen of the mobile phone 2 are in contact with each other and are stacked at a specific tilt angle. For another example, a surface of a display screen of the mobile phone 1 and a back surface of the mobile phone 2 are in contact with each other and are stacked at a specific request angle. Certainly, when postures are further divided, moving directions, tilt angles, and the like of the mobile phone 1 and the mobile phone 2 may be further distinguished between each other. Different stacking postures may be defined based on different contact surfaces, different moving directions of the mobile phones, different tilt angles of the mobile phones, and the like when the mobile phones are stacked. Details are not described by using examples one by one herein.

In this embodiment, when the posture between the first electronic device and the second electronic device satisfies a preset location posture, the first electronic device and the second electronic device may determine an interactive service between the devices based on the current location posture. In other words, a relative location posture between devices is associated with an interactive service. Different location postures between devices may trigger different interactive services between the devices. Different interactive services support different interaction modes and interaction content. For example, when the first electronic device and the second electronic device are in a first relative location posture, the first electronic device may send a document, an image, and the like displayed on the display screen to the second electronic device. For another example, when the first electronic device and the second electronic device are in a second relative location posture, the first electronic device determines the display screen of the second electronic device as an extension screen. The first electronic device displays, on the display screen of the first electronic device, a part of the user interface displayed on the display screen, and displays the other part of the user interface on the second electronic device. For another example, when the first electronic device and the second electronic device are in a third relative location posture, the first electronic device may determine the second electronic device as a function extension device. For example, the first electronic device determines to display an input control (for example, a keyboard interface) on the second electronic device. When the user enters information into the input control of the second electronic device, the second electronic device sends the entered information to the first electronic device. The first electronic device responds based on the entered information. In other words, in the third relative location posture, the second electronic device may be extended as an input device of the first electronic device. For another example, when the first electronic device and the second electronic device are in a fourth relative location posture, the first electronic device may use a display region of the second electronic device as an operation extension region. When the input device of the first electronic device acts on the operation extension region, the first electronic device sends an input instruction to the second electronic device. The second electronic device responds based on the input instruction. In other words, in the fourth relative location posture, the first electronic device may perform operation control on the first electronic device.

In some embodiments, when a to-be-initiated interactive service between devices is determined based on a relative location posture between the devices, constraints such as device types, application program content displayed on display screens of the devices, and a gesture motion of a user may also be used to determine the interactive service. For example, the first electronic device and the second electronic device are in the first relative location posture. If the first electronic device and the second electronic device are devices of a same type, the first electronic device and the second electronic device may interact with each other in a first interactive service manner. If the first electronic device and the second electronic device are devices of different types, the first electronic device and the second electronic device may interact with each other in a second interactive service manner.

In a specific example, the first electronic device and the second electronic device are devices of a same type. When a long side of the first electronic device comes into contact with a long side of the second electronic device, the first electronic device is determined as a primary device, and the second electronic device is determined as an extension device of the first electronic device; or the first electronic device is determined as an extension device, and the second electronic device is determined as a primary device. In this case, the primary device may send first data to the extension device; the primary device uses a display screen of the extension device as an extension screen, and the primary device displays a part of the first data on the primary device and displays the other part of the first data on the extension device; or the primary device implements some functions of the primary device on the extension device. For example, the extension device may be used as an input device of the primary device. A specific interactive service to be performed between the primary device and the extension device may be further determined based on interface content displayed on the primary device and the extension device, a gesture motion of a user, and the like. For example, the primary device displays the user interface of the first application program, and the extension device displays a home screen of a desktop application program. When obtaining a first gesture motion of the user on the primary device and/or the extension device, the primary device sends the first data to the extension device. When detecting a second gesture motion, the primary device uses the extension device as an extension display screen to display the first data both on the primary device and the extension display screen. When the device displays the second application, the extension device may implement some functions of the primary device.

In another specific example, the first electronic device and the second electronic device are electronic devices of different types. When a long side of the first electronic device comes into contact with a long side of the second electronic device, an electronic device of a preset type may be determined as a primary device. For example, the first electronic device is a mobile phone, and the second electronic device is a notebook computer. When a long side of the mobile phone comes into contact with any side of a display screen of the notebook computer, the notebook computer is determined as a primary device, and the mobile phone is determined as an extension device. In this case, the notebook computer may determine a space region in which a display screen of the mobile phone is located as virtual operation space. Operation space of an input device of the notebook computer may be extended to the virtual operation space. In other words, the input device of the notebook computer may control the mobile phone.

Figure 3A:
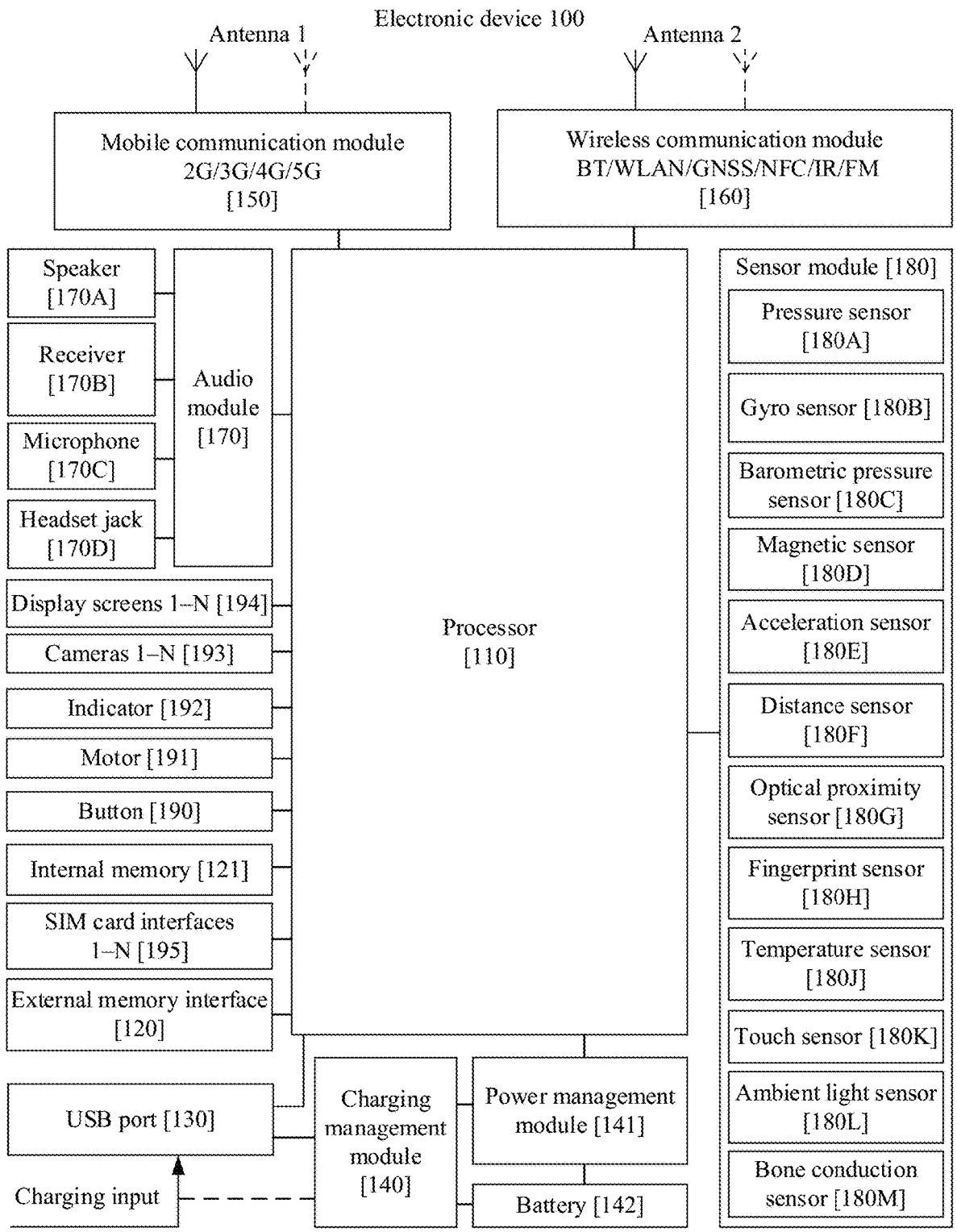
FIG. 3A and FIG. 3B are schematic diagrams of structures of an electronic device according to an embodiment of this application.

For electronic devices in embodiments of this application, as shown in FIG. 3A, an electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display screen 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces waiting time of the processor 110, to improve system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, a universal serial bus (universal serial bus, USB) port, and/or the like.

It may be understood that an interface connection relationship between the modules that is shown in this embodiment of the present invention is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

A wireless communication function of the electronic device 100 may be implemented through the antenna 1, the antenna 2, the mobile communication module 150, the wireless communication module 160, the modem processor, the baseband processor, and the like.

The wireless communication module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, ultra-wideband (Ultra-wideband, UWB), and the like and that is applied to the electronic device 100. The wireless communication module 160 may be one or more components integrating at least one communications processor module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communication (global system for mobile communication, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, UWB, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), a satellite based augmentation system (satellite based augmentation system, SBAS), and/or the like. In some embodiments, the electronic device may implement positioning of the electronic device by using a technology such as GPS, UWB, IR, BT, or Wi-Fi. In this embodiment of this application, a relative location posture between electronic devices may be obtained by using the wireless positioning technology such as GPS, UWB, IR, BT, or Wi-Fi.

The electronic device 100 implements a display function by using the GPU, the display screen 194, the application processor, and the like. The GPU is a microprocessor for image processing, and is connected to the display screen 194 and the application processor. The GPU is configured to: perform mathematical and geometric calculation, and render an image. The processor 110 may include one or more GPUs that execute program instructions to generate or change display information.

The electronic device 100 may implement a photographing function by using the ISP, the camera 193, the video codec, the GPU, the display screen 194, the application processor, and the like.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and videos are stored in the external memory card.

The internal memory 121 may be configured to store computer executable program code. The executable program code includes instructions. The internal memory 121 may include a program storage area and a data storage area. The program storage area may store an operating system, an application required by at least one function (for example, a sound playing function and an image playing function), and the like. The data storage area may store data (such as audio data and an address book) and the like that are created during use of the electronic device 100. In addition, the internal memory 121 may include a high-speed random access memory, and may further include a nonvolatile memory, for example, at least one magnetic disk storage device, a flash memory device, or a universal flash storage (universal flash storage, UFS). The processor 110 runs the instructions stored in the internal memory 121 and/or the instructions stored in the memory disposed in the processor, to perform various function applications and data processing of the electronic device 100.

The electronic device 100 may implement an audio function such as music playing or recording through the audio module 170, the speaker 170A, the receiver 170B, the microphone 170C, the headset jack 170D, the application processor, and the like.

The pressure sensor 180A is configured to sense a pressure signal, and can convert the pressure signal into an electrical signal. In some embodiments, the pressure sensor 180A may be disposed on the display screen 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display screen 194, the electronic device 100 detects intensity of the touch operation by using the pressure sensor 180A. The electronic device 100 may also calculate a touch location based on a detection signal of the pressure sensor 180A. In this embodiment of this application, whether another electronic device is stacked on the electronic device may be determined based on the pressure signal detected by the pressure sensor 180A.

The gyro sensor 180B may be configured to determine a motion posture of the electronic device 100. In some embodiments, an angular velocity of the electronic device 100 around three axes (that is, axes x, y, and z) may be determined by using the gyro sensor 180B. The gyro sensor 180B may be configured to implement image stabilization during photographing. For example, when a shutter is pressed, the gyro sensor 180B detects an angle at which the electronic device 100 jitters, and calculates, based on the angle, a distance for which a lens module needs to compensate, and allows the lens to cancel the jitter of the electronic device 100 through reverse motion, to implement image stabilization. The gyro sensor 180B may be further used in a navigation scenario and a motion-sensing game scenario. In this embodiment of this application, a relative location posture between the first electronic device and a second electronic device may be determined based on the motion posture of the electronic device determined by the gyro sensor 180B.

The acceleration sensor 180E may detect magnitudes of accelerations of the electronic device 100 in various directions (usually on three axes), and may detect a magnitude and a direction of gravity when the electronic device 100 is still. The acceleration sensor 180E may be further configured to identify a posture of the electronic device, and is applied to an application such as switching between landscape mode and portrait mode or a pedometer. In this embodiment of this application, a motion direction of the electronic device and a landscape/portrait orientation status of the electronic device may be determined based on the acceleration data detected by the acceleration sensor 180E. Then, the relative location posture between the first electronic device and the second electronic device may be determined.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F to implement quick focusing. In this embodiment of this application, a distance between the first electronic device and the second electronic device may be measured by the distance sensor 180F.

The optical proximity sensor 180G may include, for example, a light-emitting diode (LED) and an optical detector such as a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may discover another electronic device by using the optical proximity sensor 180G. After the electronic device 100 determines, by using the optical proximity sensor 180G, that the second electronic device approaches the electronic device 100, the electronic device 100 may determine the relative location posture between the electronic device 100 and the second electronic device by using the wireless positioning technology.

The ambient light sensor 180L is configured to sense ambient light brightness. The electronic device 100 may adaptively adjust brightness of the display screen 194 based on the sensed ambient light brightness. The ambient light sensor 180L may also be configured to automatically adjust a white balance during photographing. The ambient light sensor 180L may further cooperate with the optical proximity sensor 180G to detect whether the electronic device 100 is in a pocket, to avoid an accidental touch. In this embodiment of this application, the ambient light sensor 180L may cooperate with the optical proximity sensor 180G, to detect whether an electronic device approaches the electronic device 100.

Figure 3B:
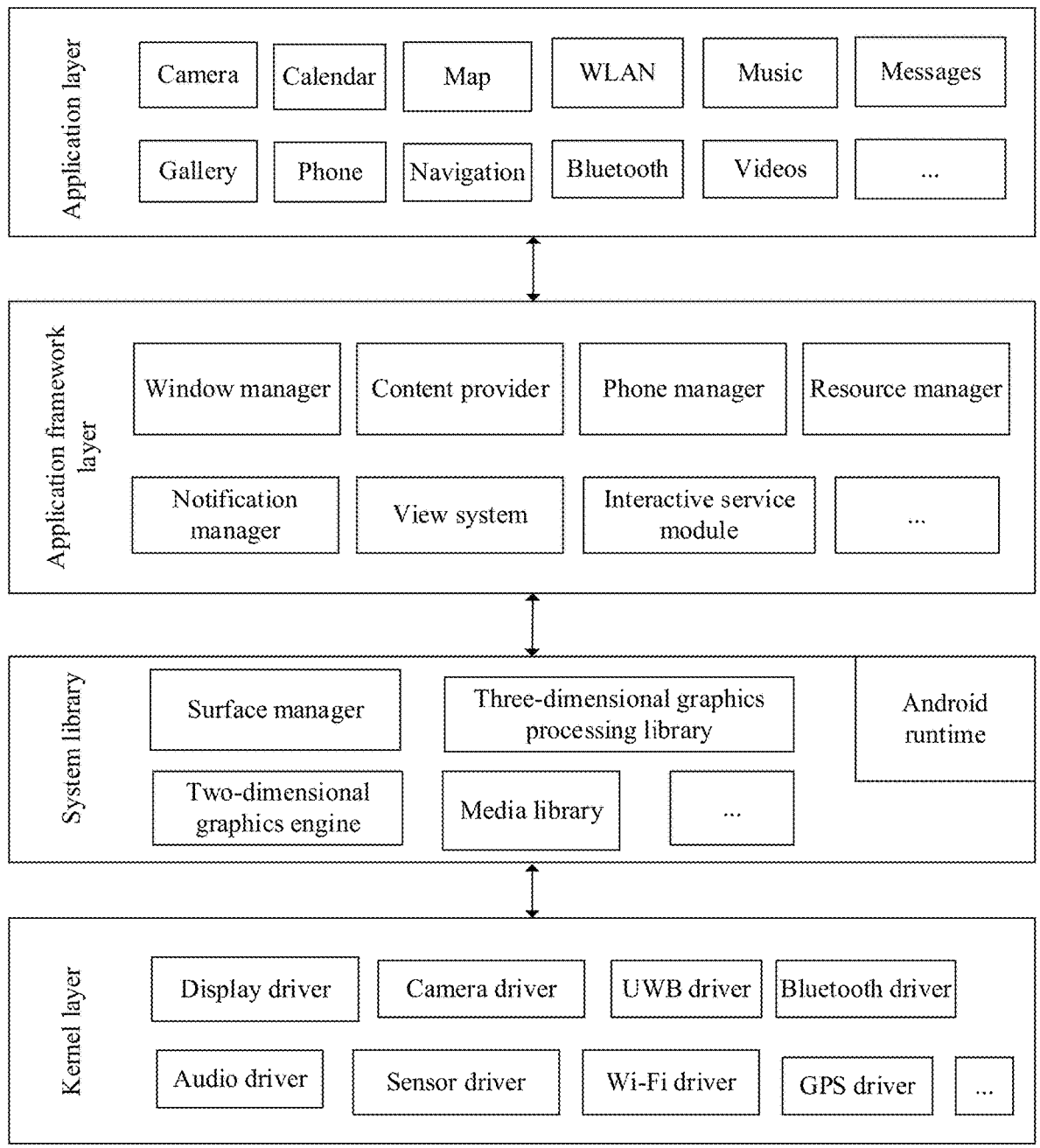

A software system of the electronic device 100 may use a layered architecture, an event-driven architecture, a microkernel architecture, a micro service architecture, or a cloud architecture. In this embodiment of the present invention, an Android system of the layered architecture is used as an example to describe the software structure of the electronic device 100. FIG. 3B is a block diagram of a software structure of an electronic device 100 according to an embodiment of this application. As shown in FIG. 3B, in a layered architecture, software is divided into several layers, and each layer has a clear role and task. The layers communicate with each other through a software interface. In some embodiments, the Android system is divided into four layers, that is, an application layer, an application framework layer, an Android runtime (Android runtime) and system library, and a kernel layer from top to bottom.

The application layer may include a series of application packages.

As shown in FIG. 3B, the application packages may include applications such as Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 3B, the application framework layer may include a window manager, a content provider, a view system, a phone manager, a resource manager, a notification manager, and the like. In this embodiment of this application, the application framework layer may include an interactive service module. The interactive service module may be configured to: determine a relative location posture between the electronic device 100 and another electronic device; determine an interactive service corresponding to the relative location posture; provide data for an application at the application layer or provide data at the application layer for another electronic device based on the determined interactive service; or control another electronic device to implement a specific function and the like.

The window manager is configured to manage a window program. The window manager may obtain a size of a display screen, determine whether there is a status bar, perform screen locking, take a screenshot, and the like.

The content provider is configured to: store and obtain data, and enable the data to be accessed by an application. The data may include a video, an image, an audio, calls that are made and received, a browsing history and bookmarks, an address book, and the like.

The view system includes a visual control, such as a control for displaying a text or a control for displaying a picture. The view system may be configured to construct an application. A display interface may include one or more views. For example, a display interface including a notification icon of Messages may include a text display view and a picture display view.

The resource manager provides various resources for an application such as a localized character string, an icon, a picture, a layout file, and a video file.

The Android runtime includes a core library and a virtual machine. The Android runtime is responsible for scheduling and management of the Android system.

The core library includes two parts: a function that needs to be invoked in Java language and a core library of Android.

The application layer and the application framework layer run on the virtual machine. The virtual machine executes Java files at the application layer and the application framework layer as binary files. The virtual machine is configured to perform functions such as object lifecycle management, stack management, thread management, security and exception management, and garbage collection.

The kernel layer is a layer between hardware and software. The kernel layer includes at least a display driver, a camera driver, an audio driver, a sensor driver, a UWB driver, a Bluetooth driver, a GPS driver, a Wi-Fi driver, and the like. In this embodiment of this application, positioning data of the electronic device may be detected by using the UWB driver, the Bluetooth driver, the GPS driver, the Wi-Fi driver, and the like. The acceleration data and device proximity data of the electronic device may be detected by using the sensor driver. The UWB driver, the Bluetooth driver, the GPS driver, the Wi-Fi driver, and the sensor driver send the detected data to the interactive service module, so that the interactive service module determines the relative location posture between the devices, and determines the interactive service based on the relative location posture. The interactive service module performs cross-device interaction with the second electronic device based on the determined interactive service.

Based on the structures of the interaction system and the electronic device that are provided above, the following details the device interaction method in embodiments of this application with reference to specific scenarios.

Figure 4A:
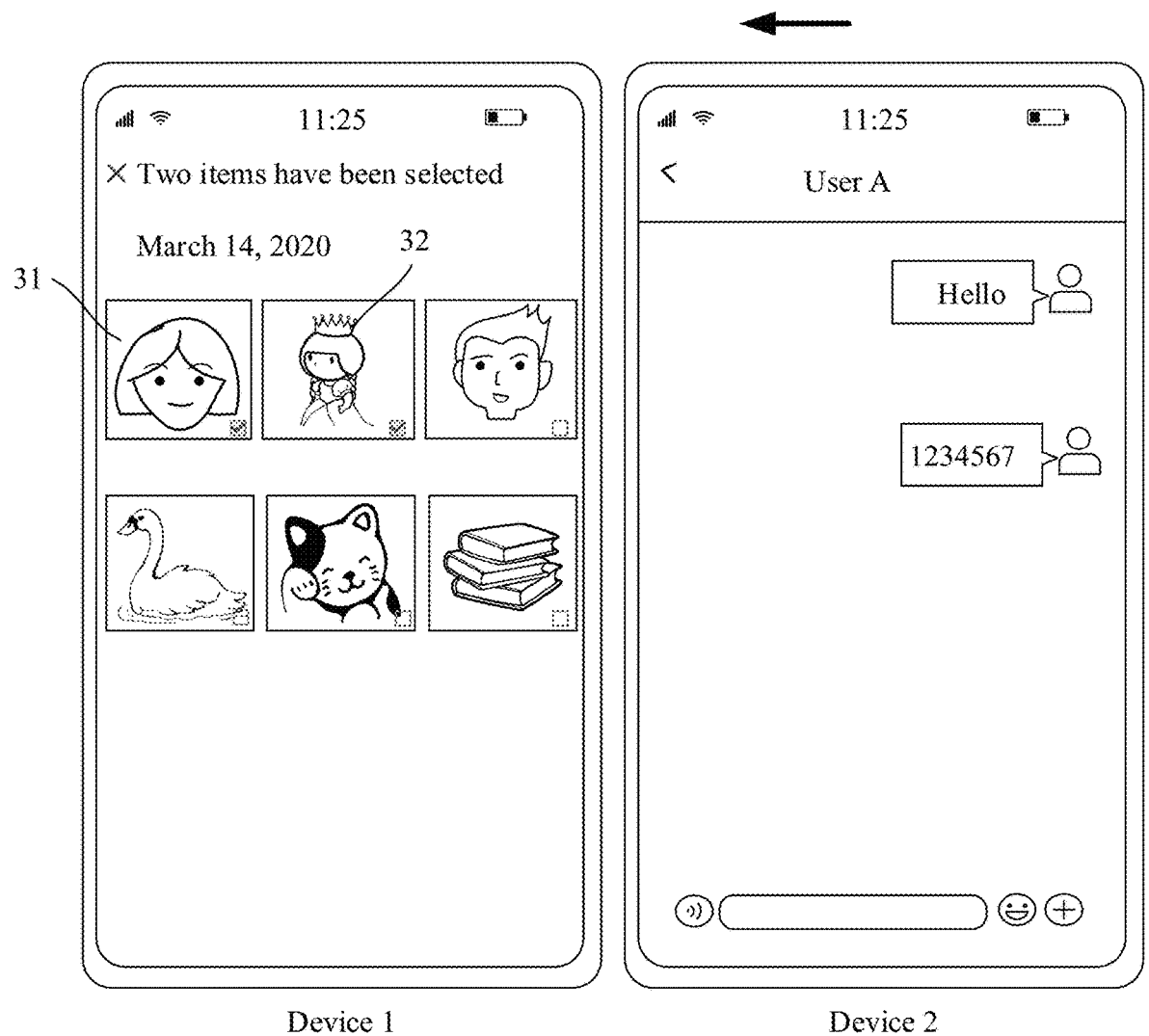
FIG. 4A to FIG. 4G are schematic diagrams of device interaction in Scenario 1 according to an embodiment of this application.

Scenario 1: A device 1 displays a user interface of a gallery application program. Optionally, at least one image in the gallery is in a selected state. As shown in FIG. 4A, an image 31 and an image 32 in the gallery are in a selected state. Certainly, in some embodiments, all images in the gallery may be alternatively in an unselected state. A device 2 displays a chat interface of an instant messaging application program. Specifically, the device 2 displays a chat interface of a user A. In this scenario, interaction between the device 1 and the device 2 may be as follows:

In some embodiments, as shown in FIG. 4A, when a long side of the device 2 comes into contact with a long side of the device 1, an interactive service is triggered between the device 1 and the device 2. Optionally, in the interactive service, display screens of the device 1 and the device 2 may be used as one combined screen. Data displayed on the combined screen may be moved from one region to another. When the data displayed on the combined screen moves from a region of the device 1 to a region of the device 2, the data can be transmitted from the device 1 to the device 2.

As shown in FIG. 4A, that the device 1 and the device 2 determine that the long side of the device 2 comes into contact with the long side of the device 1 may be: The device 1 discovers the device 2, and the device 1 and the device 2 detect location postures of each other to determine that the long side of the device 2 comes into contact with the long side of the device 1. That the device 1 discovers the device 2 may be: The device 1 discovers the device 2 from devices connected to a same communication network as the device 1. For example, the device 1 discovers the device 2 from devices connected to a same Wi-Fi network as the device 1 or logged in to a same account as the device 1. In some embodiments, the device 1 discovers the device 2 from devices that enable a specific short-range communication function. For example, the device 1 discovers the device 2 from devices that enable a Bluetooth signal and that support a Wi-Fi direct connection technology; or the device 1 discovers, by using UWB or Bluetooth ranging, the device 2 from devices located within a specific distance range. Herein, only some possible manners of discovering the device 2 by the device 1 are enumerated, and other possible manners are not described by using examples one by one.

In some embodiments, a process in which the device 1 and the device 2 detect that the long side of the device 2 comes into contact with the long side of the device 1 may be: The device 1 detects positioning data of the device 1 or the device 2 by using a Bluetooth driver or a UWB driver. The positioning data may be absolute positioning data, or may be relative positioning data. The Bluetooth driver or the UWB driver sends the positioning data to an interactive service module of the device 1. The interactive service module determines an orientation of the device 2, a distance between the device 2 and the device 1, and the like based on the positioning data. In other words, the device 1 can determine, based on the positioning data, a direction from which the device 2 moves. Optionally, the interactive service module may further calculate a moving speed of the device 2 based on the positioning data. Certainly, in this process, the device 2 may also detect the device 1. Optionally, the device 1 and the device 2 may exchange the detected positioning data.

In some embodiments, in addition to the positioning data, posture data such as acceleration data, tilt angles, moving speeds, or landscape/portrait orientation statuses may be further exchanged between the device 1 and the device 2. Optionally, when the device 1 comes into contact with the device 2, the device 1 and the device 2 detect contact signals. Then, the device 1 and the device 2 may further exchange information such as a contacted location and a contacting location. The device 1 may determine, based on one or more of the positioning data, the acceleration data, the tilt angle, the moving speed, and the landscape/portrait orientation status of the device 1 and one or more of the positioning data, the acceleration data, the tilt angle, the moving speed, and the landscape/portrait orientation status of the device 2, that the long side of the device 2 comes into contact with the long side of the device 1.

In some embodiments, the device 1 detects that acceleration of the device 1 is approximately equal to zero, that is, the device 1 is in a still state. The device detects that acceleration of the device is not zero, that is, the device 2 is in a moving state. During movement of the device 2, the device 1 continuously detects the relative distance between the device 1 and the device 2. After the relative distance between the device 1 and the device 2 is less than a first threshold, the device 1 and the device 2 detect the contact signals within a preset time. The device 1 sends first confirmation information that the contact signal is detected to the device 2, and the device 2 sends second confirmation information that the contact signal is detected to the device 1. In this case, the device 1 confirms that the device 1 comes into contact with the device 2, and may determine the moving direction of the device 2. Then, the device 1 detects that the device 1 is in a portrait orientation state. The device 2 sends the acceleration data of the device 2 to the device 1. The device 1 may determine, through calculation based on the acceleration data of the device 2, that the device 2 is in a portrait orientation state. The device 1 may determine, based on the posture information indicating that the device 1 is in a portrait mode and is still, the moving direction in which the device 2 moves toward the device 1, and the portrait orientation state of the device 2, that the long side of the device 2 comes into contact with the long side of the device 1. The device 1 and the device 2 may detect pressure signals by using pressure sensors disposed around the devices; and determine whether the electronic device comes into contact or is passively in contact and the contacting location or the contacted location by using the pressure signals. Optionally, the device 1 and the device 2 may further collect audio signals by using microphones; and determine whether the electronic device comes into contact or is passively in contact and the contacting location or the contacted location by using the audio signals. In some embodiments, the device 1 may determine, through calculation based on the distance between the device 1 and the device 2, the moving speeds, approach directions, sizes of the devices, and the like, whether the device 1 and the device 2 come into contact with each other; and determine data such as the contact locations based on the calculation result.

In some other embodiments, the device 2 may send, to the device 1, the portrait orientation state, the moving direction, and the contacting location when the device 2 is in a portrait mode. The device 1 determines, based on the information indicating that the device 1 is still and is in a portrait mode, the contacted location, and the like, and in combination with the information sent by the device 2, that the long side of the device 2 comes into contact with the long side of the device 1. Certainly, there may be a plurality of manners in which the device 1 determines that the long side of the device 2 comes into contact with the long side of the device 1. Details are not described herein.

In some embodiments, after the long side of the device 2 comes into contact with the long side of the device 1, the device that is passively in contact may be used as a primary device for subsequent interaction, and the device that comes into contact may be used as an extension device. The primary device may control the extension device to perform a specific operation, or the primary device may implement a specific function in the extension device. In some other embodiments, alternatively, the device that is passively in contact may be determined as an extension device, and the device that comes into contact may be determined as a primary device. This is not limited in this embodiment. Certainly, in some embodiments, alternatively, the primary device and the extension device may not be determined between the device 1 and the device 2.

Optionally, after the long side of the device 2 comes into contact with the long side of the device 1, types of the device 1 and the device 2 may be further determined. If the device 1 and the device 2 are of a same device type, the device that is passively in contact may be used as the primary device for subsequent interaction, and the device that comes into contact may be used as the extension device. If the device 1 and the device 2 are not of a same device type, a device of a specific type may be preset as the primary device. As shown in FIG. 4A, in this embodiment, the device 1 is determined as the primary device for subsequent interaction, and the device 2 is determined as the extension device.

In some embodiments, after the device 1 is determined as the primary device and the device 2 is determined as the extension device, the device 1 provides first data for the device 2 by default. The device 1 may display prompt information, to prompt the user to select, from the device 1, the first data provided for the device 2. Alternatively, as shown in FIG. 4A, when the image 31 and the image 32 in the device 1 are already in the selected state, the device 1 automatically sends data of the image 31 and the image 32 to the device 2. Alternatively, after detecting a given gesture motion of the user, the device 1 sends data of the image 31 and the image 32 to the device 2.

In some embodiments, after the device 1 is determined as the primary device and the device 2 is determined as the extension device, the device 1 may continue to detect interface content displayed on the display screens. If the device 1 displays a first user interface, the device 1 may determine to provide first data for the device 2. If the device 2 displays a first user interface, the device 1 may control the device 2 to provide first data for the device 1.

In some embodiments, after the device 1 is determined as the primary device and the device 2 is determined as the extension device, the device 1 may continue to detect whether data in a selected state exists on the display screens. If the device 1 has first data in a selected state, the device 1 may determine to provide the first data for the device 2. If the device 2 has first data in a selected state, the device 1 may control the device 2 to provide the first data for the device 1.

In some embodiments, after the device 1 determines that the long side of the device 2 comes into contact with the long side of the device 1, the display screens of the device 1 and the device 2 become one combined screen. The device 1 may determine a size of the display screen of the device 2 based on the type of the device 2. Optionally, the device 1 and the device 2 exchange their respective display screen information. The device 1 determines a display screen extension region of the device 1 based on the display screen information of the device 2. Likewise, the device 2 determines a display screen extension region of the device 2 based on the display screen information of the device 1.

Figure 4B:
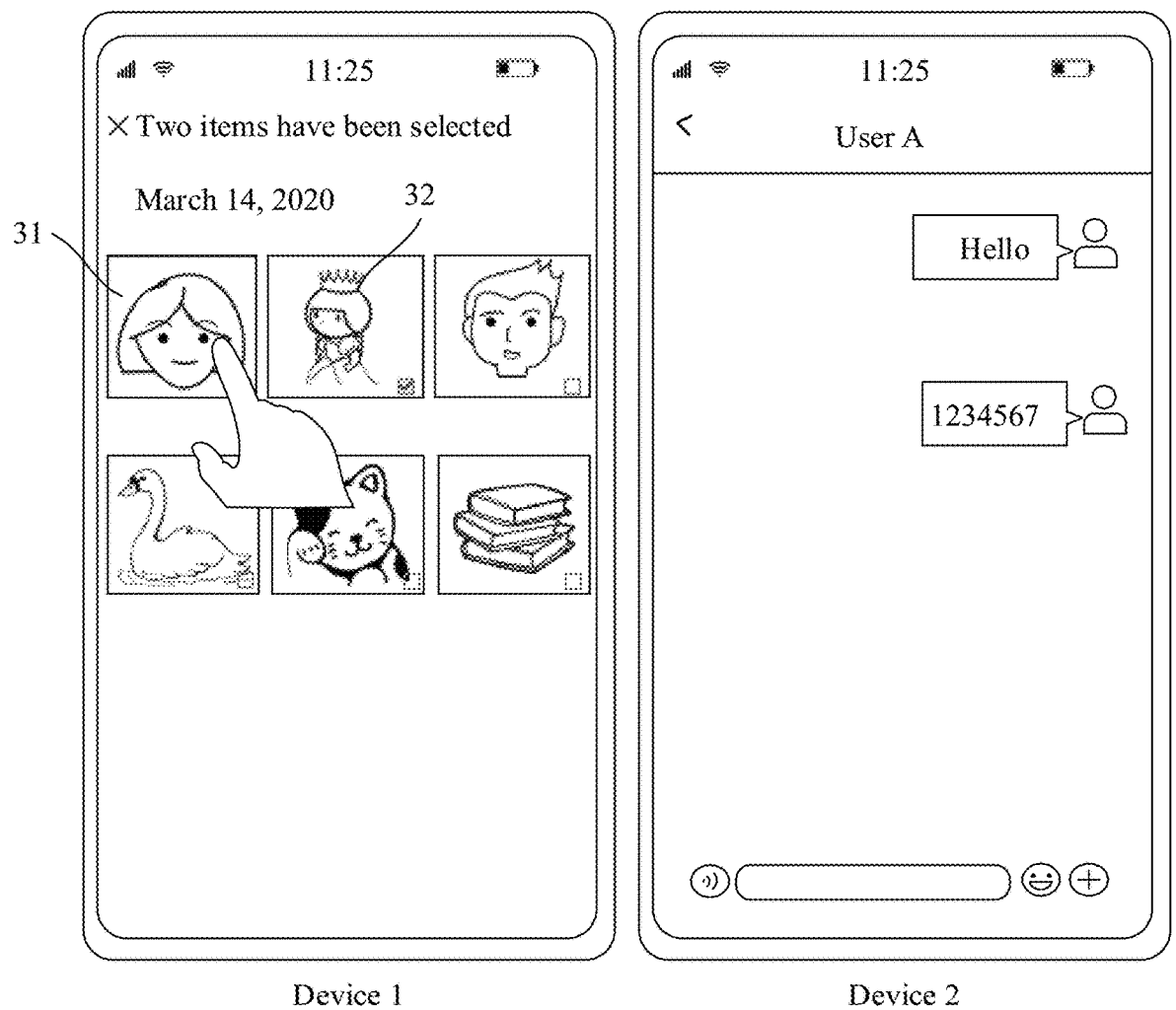
Figure 4C:
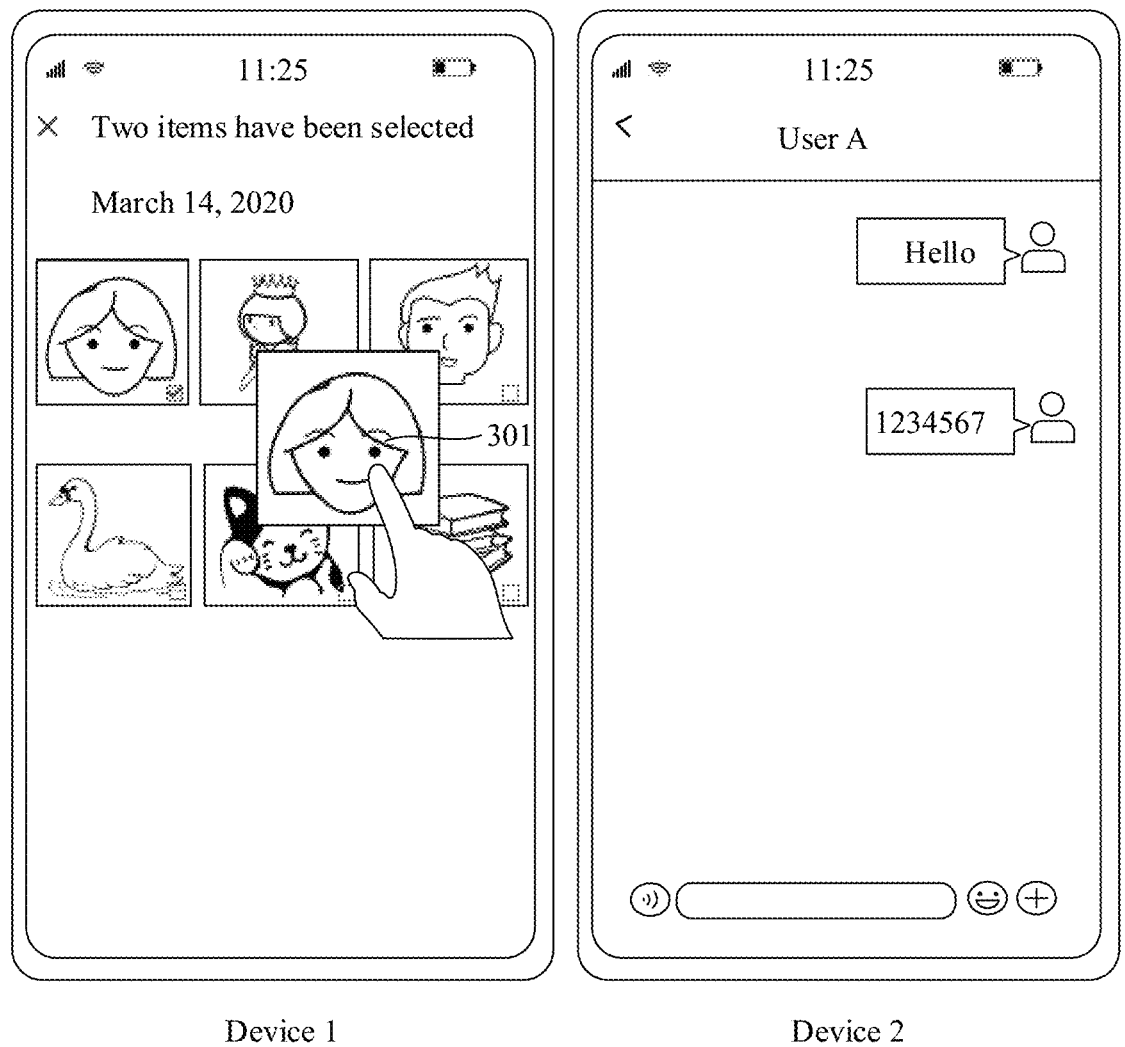

As shown in FIG. 4B, the device 1 detects a pressing motion of the user acting on the image 31. If detecting that duration of the pressing motion is greater than a second preset value, the device 1 determines that a touch and hold motion is detected. Optionally, the device 1 may send information about the touch and hold motion to the device 2. The device 2 determines, based on the information about the touch and hold motion, that a data selection motion occurs in a display region of the device 1. As shown in FIG.

4C, in response to the detected touch and hold motion, the device 1 generates a thumbnail 301 of the image 31 based on information about the image 31. The device 1 may generate the thumbnail 301 based on information such as a name, a size, and a type of the image 31. In addition to the touch and hold motion, the device 1 detects a dragging motion. The device 1 displays the thumbnail 301 based on coordinates of the dragging motion. In other words, the thumbnail 301 may move along with movement of the coordinates of the dragging motion. Optionally, the device 1 may send information about the dragging motion and the thumbnail 301 to the device 2. Based on the coordinates of the dragging motion and a size of the thumbnail 301, the device 2 may determine an action location of the dragging motion on the device 1, or may determine whether the device 1 can completely display the thumbnail 301. If the device 1 cannot completely display the thumbnail 301, the device 2 may further determine, based on the coordinates of the dragging motion, the size of the thumbnail 301, and the size of the display screen of the device 2, a part that is of the device 2 and that displays the thumbnail.

In some embodiments, in a process of dragging the thumbnail 301 by the user, the device 1 further detects whether the device 1 can completely display the thumbnail 301. If the device 1 cannot completely display the thumbnail 301, the device 1 may display a part of the thumbnail 301, and display the other part of the thumbnail 301 on the device 2. Optionally, the device 1 may determine, based on the coordinates of the dragging motion, the size of the thumbnail 301, and the location of the dragging motion relative to the thumbnail 301, whether the display screen of the device 1 can completely display the thumbnail 301. In addition, when the device 1 cannot completely display the thumbnail 301, the device 1 determines, based on the coordinates of the dragging motion, the size of the thumbnail 301, and the location of the dragging motion relative to the thumbnail 301, the part displayed on the device 1 and the part displayed on the device 2. Alternatively, the device 1 may determine only the part displayed on the device 1. The device 1 sends the information about the dragging motion to the device 2, so that the device 2 determines the part of the thumbnail displayed on the device 2.

Figure 4D:
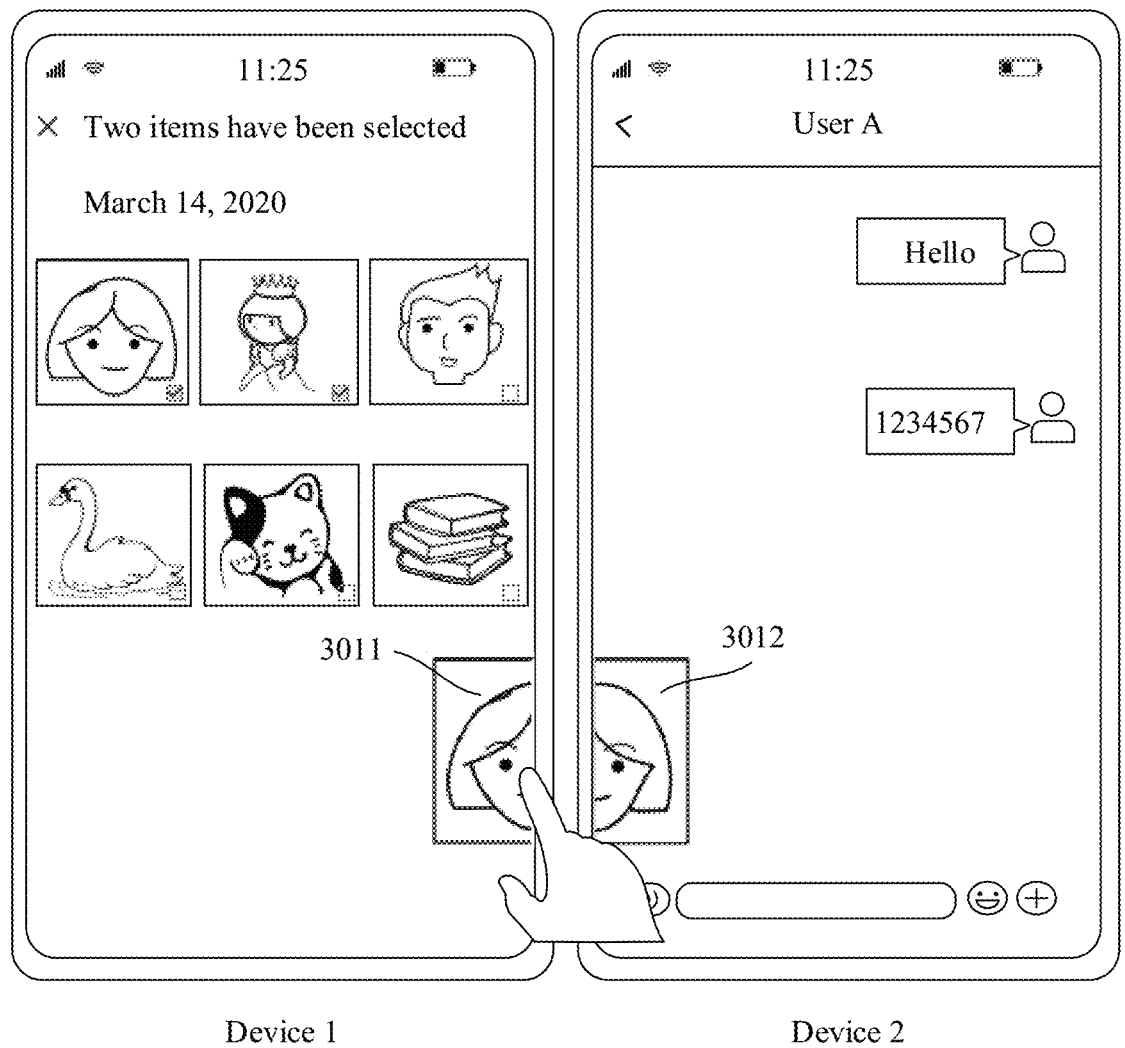

As shown in FIG. 4D, when a dragging motion of the user is performed on an edge that is of the device 1 and that is close to the device 2, the device 1 determines to display a region 3011 of the thumbnail 301 on the device 1. The device 2 determines to display a region 3012 of the thumbnail 301 on the device 2 based on coordinates of the dragging motion sent by the device 1. In another possible manner, after the device 1 determines to display a region 3011 of the thumbnail 301 on the device 1, the device 1 sends information about a region 3012 and information about a display location of the region 3012 on the device 2 to the device 2, so that the device 2 displays the region 3012. Likewise, a dragging motion moves to the device 2. The device 2 determines, based on coordinates of the dragging motion, the size of the thumbnail 301, and a location of the dragging motion relative to the thumbnail 301, whether the device 2 can completely display the thumbnail 301. In addition, when the device 2 cannot completely display the thumbnail 301, the device 2 determines the part of the thumbnail 301 displayed on the device 2 and the part of the thumbnail 301 displayed on the device 1.

Figure 4E:
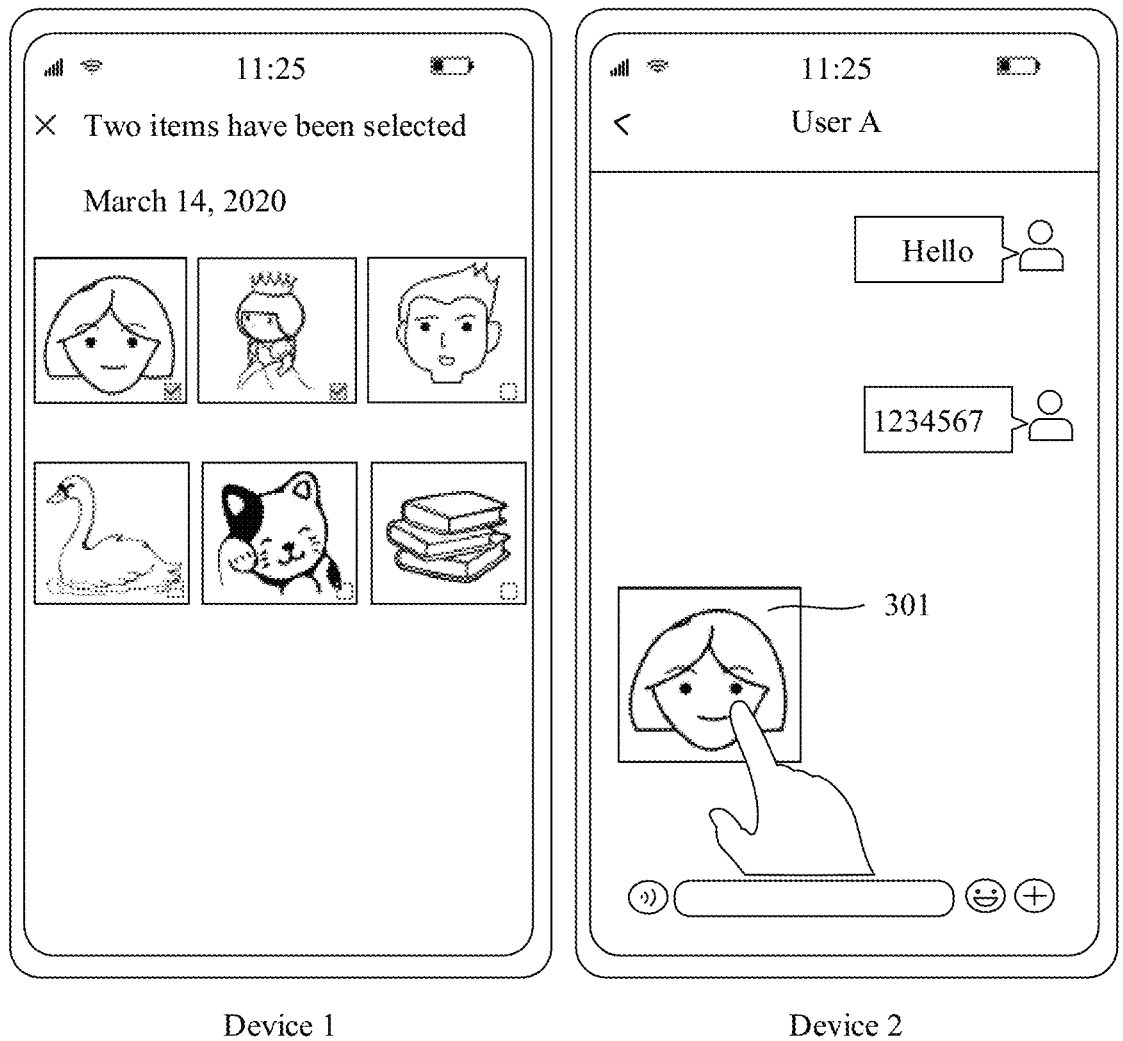
Figure 4F:
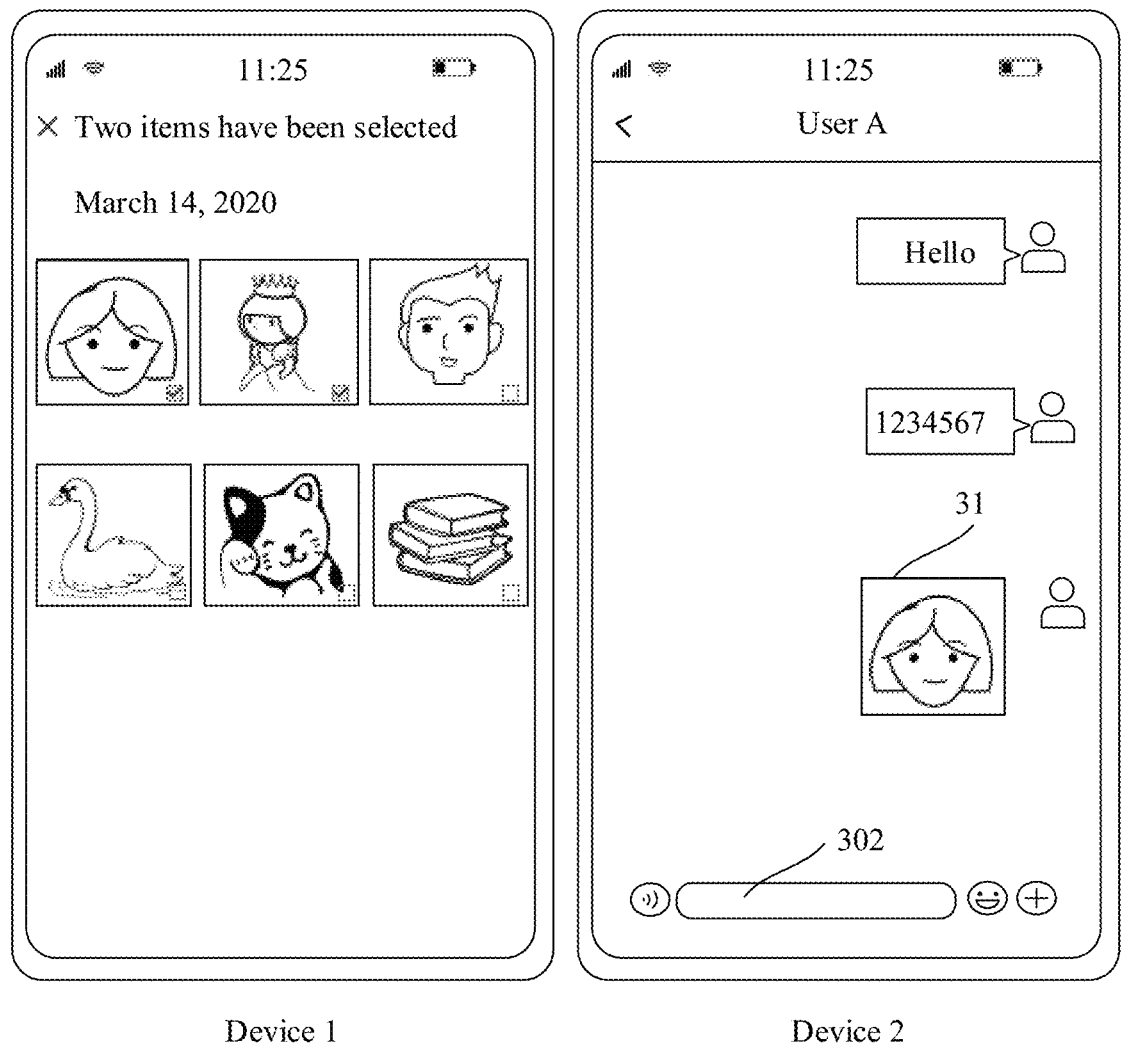

As shown in FIG. 4E, the thumbnail 301 moves along with movement of the dragging motion on the device 2. As shown in FIG. 4F, when detecting a release motion of the dragging motion of the thumbnail 301, the device 2 enters the data of the image 31 into an input box 302, and displays the image 31 as a message in a message display region of the chat interface of the user A.

The device 2 obtains the data of the image 31 from the device 1. Specifically, after detecting the touch and hold motion performed on the image 31, the device 1 may send the data of the image 31 to the device 2. Alternatively, after detecting the dragging motion performed on the thumbnail 301, the device 1 may send the data of the image 31 to the device 2. Alternatively, after detecting the release motion, the device 2 may send, to the device 1, a request for obtaining the data of the image 31; and the device 1 sends the data of the image 31 to the device 2 according to the request.

Figure 4G:
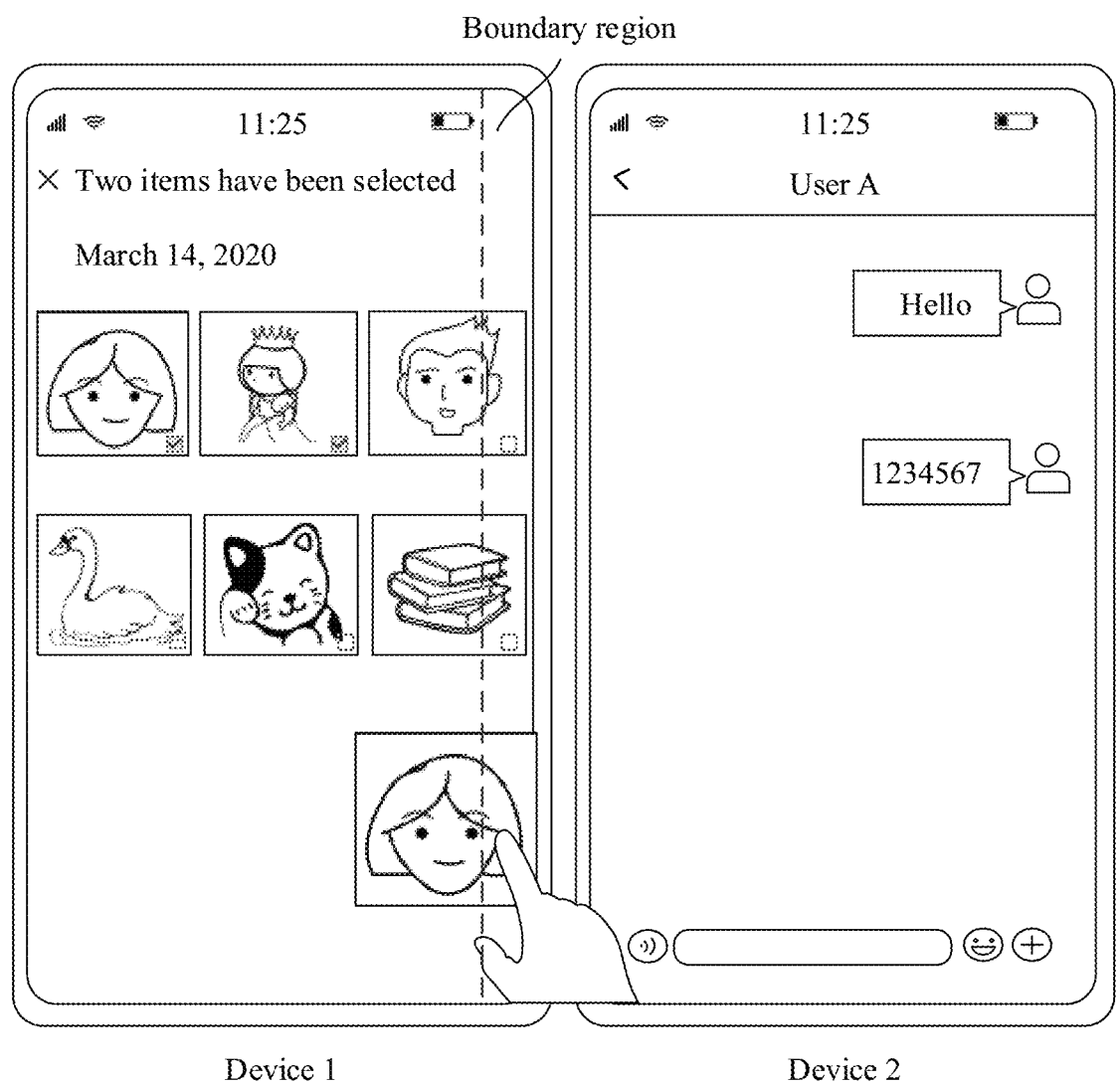

In another optional embodiment, a boundary region is set in a display region that is of the device 1 and that is close to the device 2. As shown in FIG. 4G, when the device 1 detects that coordinates of a dragging motion are located in the boundary region, the device 2 displays the thumbnail 301, and the device 1 no longer displays the thumbnail 301. Then, FIG. 4E is redirected. As shown in FIG. 4E, the thumbnail 301 on the device 2 may continue to move along with movement of the dragging motion.

In this embodiment, for a procedure for transmitting the image 32 in the device 1 to the device 2, refer to a processing procedure of the image 31. Details are not described again. Certainly, the user may alternatively drag the image 31 and the image 32 at the same time by using a dragging motion, to drag the image 31 and the image 32 to the instant messaging application program of the device 2 at the same time. The instant messaging application program may determine, based on a sequence of receiving the data of the image 31 and the image 32, a sequence of displaying the image 31 and the image 32 on the chat interface.

In this embodiment of this application, in addition to image data, some texts/images/graphs in an application document, a folder, and an electronic document, configuration data of an electronic device, and the like may be further transmitted between the device 1 and the device 2. For a specific process, refer to the procedure in this scenario.

Figure 5A:
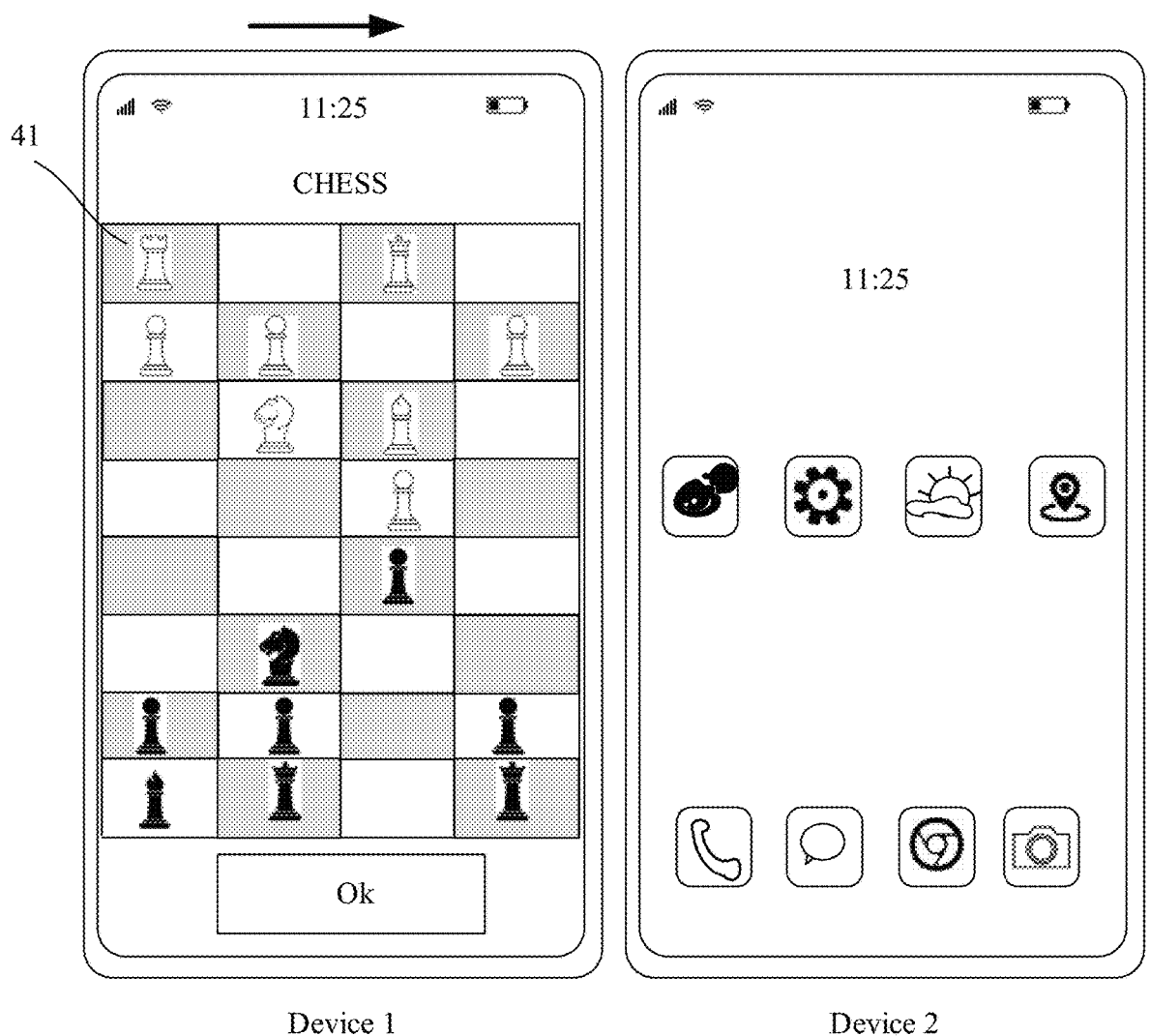
FIG. 5A to FIG. 5E are schematic diagrams of device interaction in Scenario 2 according to an embodiment of this application.

Scenario 2: As shown in FIG. 5A, a chess game is run in the device 1. The display screen of the device 1 displays a game interface 41. The device 2 displays a home screen of a desktop application program. In this scenario, the device 2 may be used as an extension display screen of the device 1. To be specific, the display screens of the device 1 and the device 2 are used as a combined screen to jointly display the game interface 41. A processing process thereof is as follows:

As shown in FIG. 5A, the long side of the device 1 comes into contact with the long side of the device 2. For a manner in which the device 1 detects that the long side of the device 1 comes into contact with the long side of the device 2, refer to Scenario 1. For example, the device 1 determines, through MB or Bluetooth positioning, that the device 2 is located beside the long side of the device 1. The device 1 detects acceleration data of the device 1; and based on the acceleration data, determines a moving direction of the device 1 and determines that the device 1 is in a portrait orientation state. The device 1 determines, based on the moving direction of the device 1, a direction in which the device 2 is located, the information indicating that the device 1 is in the portrait orientation state, and the information indicating that the device 2 is in a portrait orientation state, that the device 1 moves close to the device 2 and that the long side of the device 1 comes into contact with the long side of the device 2.

Figure 5B:
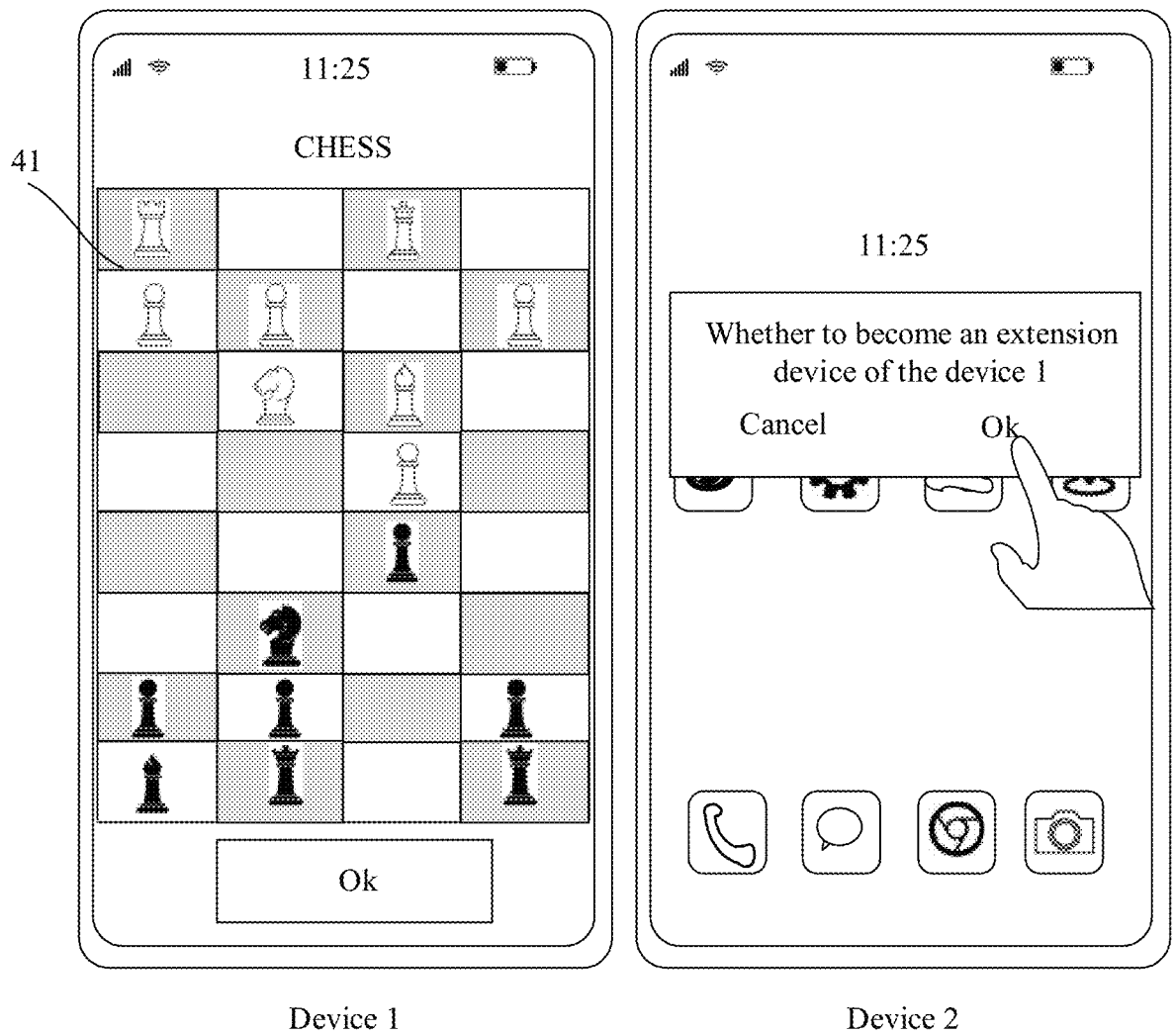
Figure 5C:
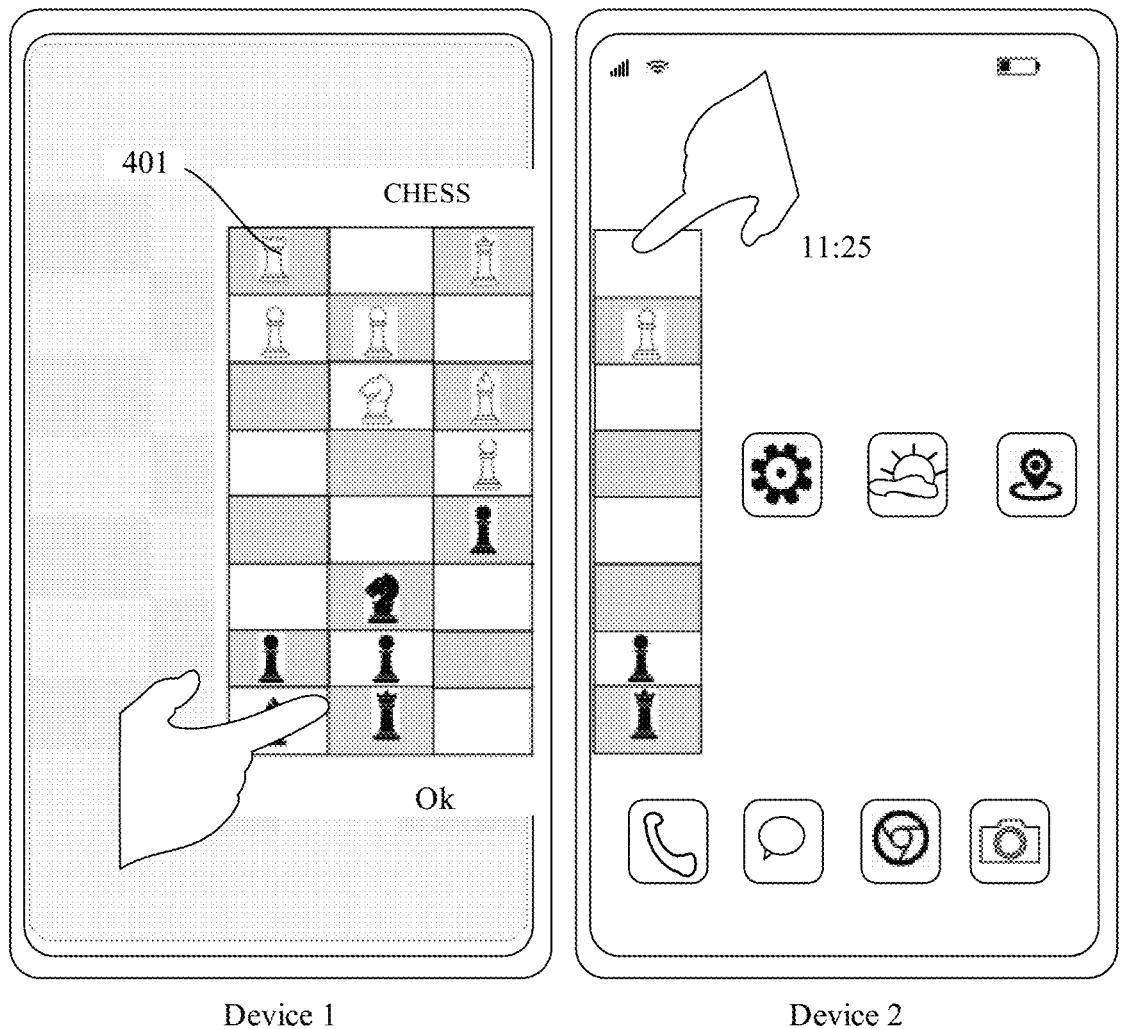
Figure 5D:
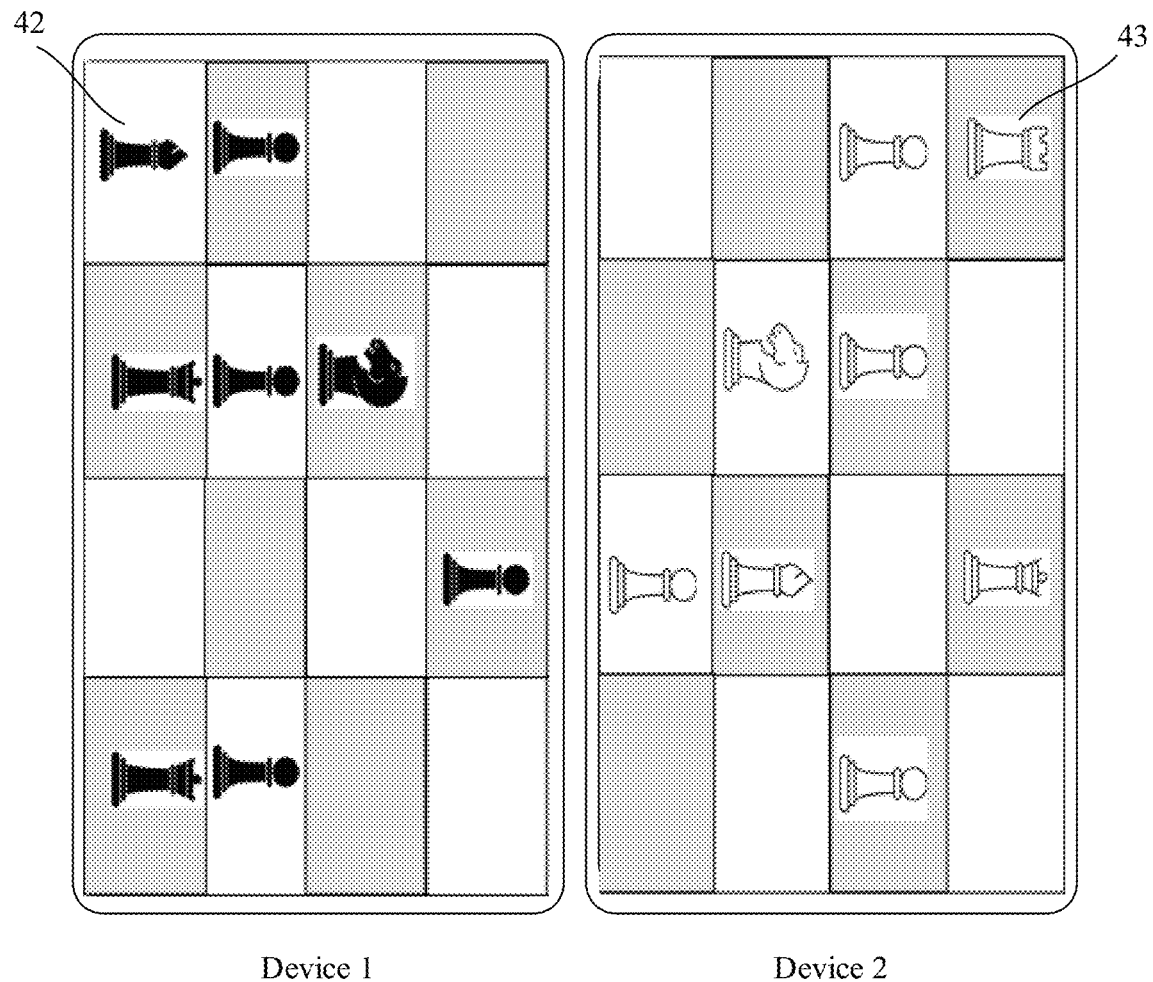

In some embodiments, after the long side of the device 1 comes into contact with the long side of the device 2, as shown in FIG. 5D, the device 1 displays a part of the current game interface on the device 1 and displays the other part of the current game interface on the device 2. For example, the device 1 displays a black-piece interface of the current game interface on the device 1, and a white-piece interface of the current game interface on the device 2.

In some embodiments, before the display screen of the device 1 is extended to the display screen of the device 2 for display, the device 1 further obtains auxiliary information. The auxiliary information includes information such as device types and device accounts. Whether the device 1 and the device 2 are devices of a same type may be determined based on the device type information. Whether the device 1 and the device 2 are devices of a same user may be determined based on the device accounts.

In this embodiment of this application, different interactive service manners may be determined based on the types of the device 1 and the device 2. For example, when the device 1 and the device 2 are devices of a same type, the device 1 and the device 2 perform a first-type interactive service. In the first-type interactive service, the device 1 may be determined as a primary device, and the device 2 may be determined as an extension device. When the device 1 and the device 2 are devices of different types, the device 1 and the device 2 perform a second-type interactive service. In the second-type interactive service, a device of a predetermined type may be determined as a primary device. In this scenario, the device 1 and the device 2 are electronic devices of a same type.

As shown in FIG. 5B, when the device accounts of the device 1 and the device 2 are different, the device 2 displays prompt information indicating whether to become an extension device of the device 1. After detecting a click motion acting on a confirmation control, the device 2 determines to become the extension device of the device 1. The device 2 sends, to the device 1, confirmation information that the device 2 becomes the extension device of the device 1.

In some embodiments, before jointly displaying the game interface on the display screens of the device 1 and the device 2, the device 1 further detects a first gesture motion. In an example, as shown in FIG. 5C, the first gesture motion is a pinch motion separately performed on the device 1 and the device 2. The device 1 generates a thumbnail 401 of the interface 41 in response to the detected first gesture motion. The device I jointly displays the thumbnail 401 on the display screens of the first device and the second device based on coordinates of the first gesture motion. For a manner in which the device 1 and the device 2 jointly display the thumbnail 401, refer to the manner in which the device 1 and the device 2 jointly display the thumbnail 301 in FIG. 3D.

Further, the device 1 further obtains the display screen information of the device 2. The display screen information of the device 2 includes the size of the display screen. Optionally, the device 2 sends the display screen information of the device 2 to the device 1. Alternatively, the device 1 determines the display screen information of the device 2 based on the device type of the device 2.

After obtaining the display screen information of the device 2, the device 1 determines the display screen of the device 2 as an extension screen of the device 1. As shown in FIG. 5D, the device 1 determines, based on the sizes of the display screens of the device 1 and the device 2, that the display screen of the device 1 displays a first part 42 of the game interface 41, and that the device 2 displays a second part 43 of the game interface 41. The first part 42 and the second part 43 are combined into a complete game interface.

When an operation acting on the second part 43 is detected on the device 2, the device 2 sends an instruction corresponding to the operation to the device 1. The device 1 determines, based on the instruction, to generate a response message, the device 1 updates the game interface based on the response message, and the device 1 sends an updated second part to the device 2 based on an updated game interface.

Based on the method in this embodiment of this application, in addition to jointly displaying a game interface on a plurality of electronic devices, an image, an electronic document, a video, and the like may be further displayed jointly.

Figure 5E:
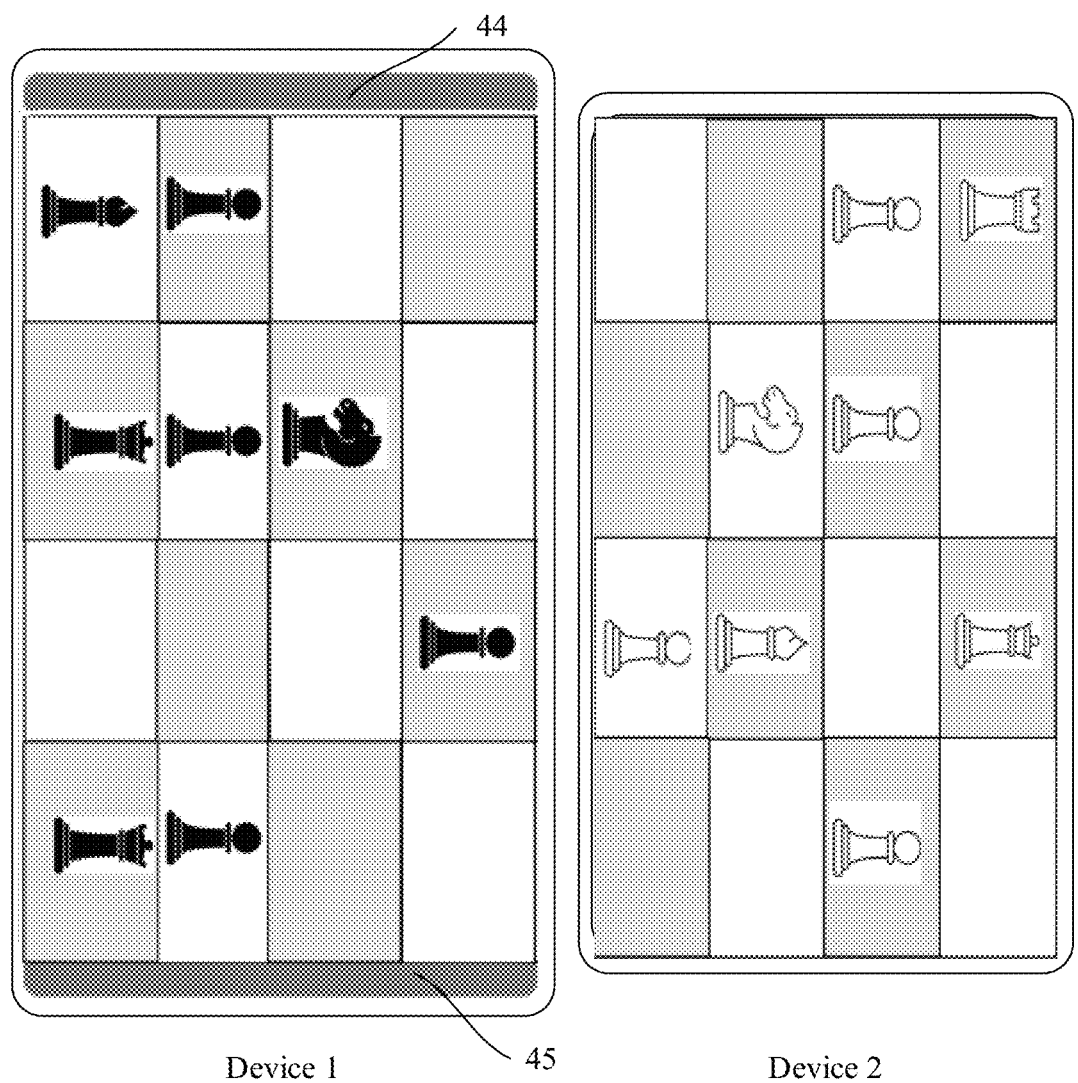

As shown in FIG. 5E, if the device 1 and the device 2 are devices of a same type, but the size of the display screen of the device 1 is greater than the size of the display screen of the device 2, the device 1 may set an edge 44 and an edge 45 of the display screen of the device 1 as black frame display regions, and combine the display screen of the device 2 and a region other than the black frame regions into a display region of the game interface.

Figure 6A:
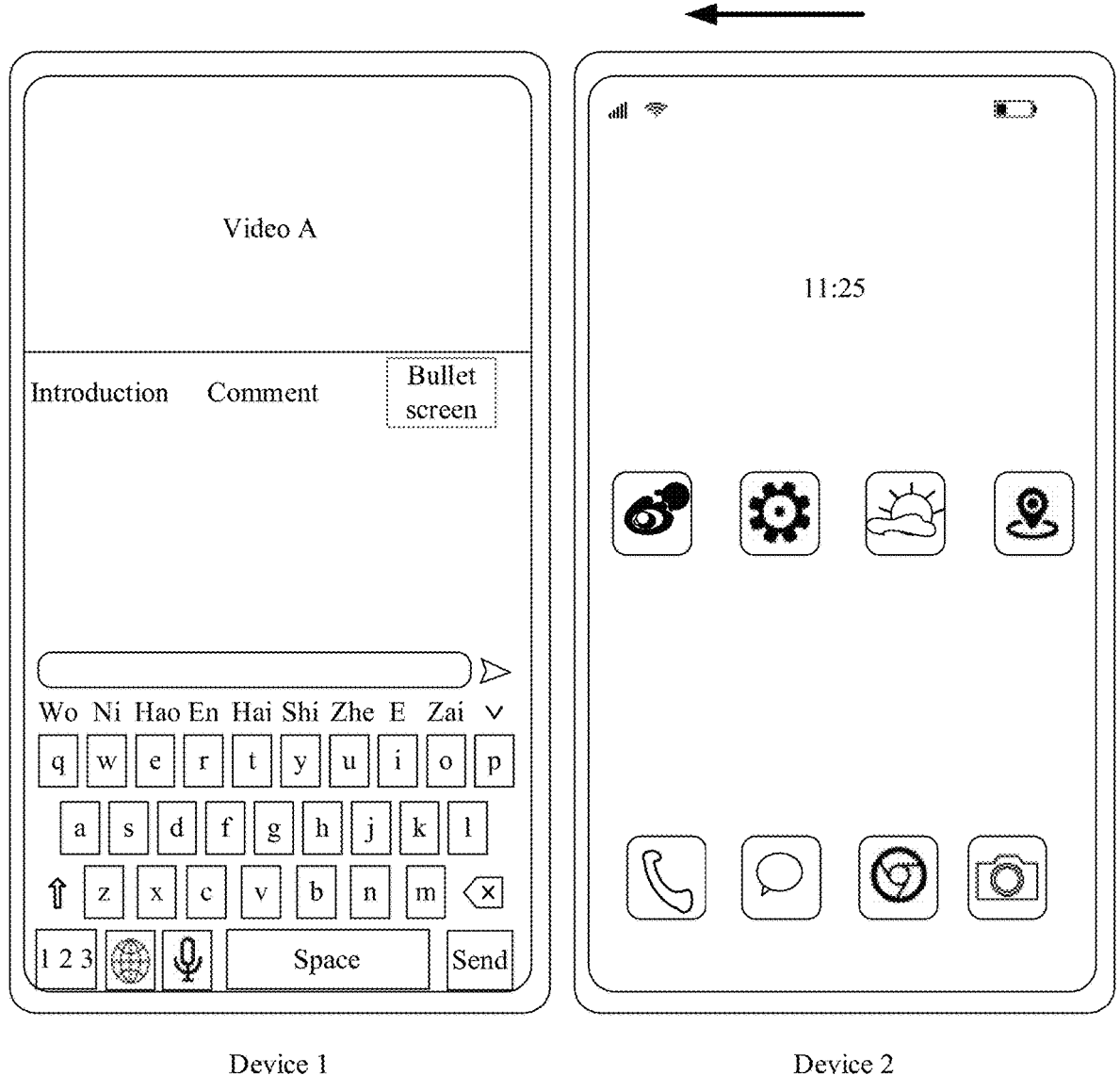
FIG. 6A to FIG. 6D are schematic diagrams of device interaction in Scenario 3 according to an embodiment of this application.

Scenario 3: As shown in FIG. 6A, the display screen of the device 1 displays a video-A playing interface of a video application program, and the display screen of the device 2 displays a home screen of a desktop application program. The video-A playing interface includes an introduction control, a comment control, and a bullet screen control. When a user clicks the bullet screen control, a keyboard control is displayed on the video-A playing interface. In the scenario shown in FIG. 6A, the device 1 may use the device 2 as an input device. Details are as follows:

As shown in FIG. 6A, the device 2 moves close to the device 1 and the long side of the device 2 comes into contact with the long side of the device 1. The device 1 is determined as a primary device, and the device 2 is determined as an extension device. In some embodiments, the device 2 may display prompt information indicating whether to become an extension device of the device 1.

In some embodiments, after the device 1 is determined as the primary device, the device 1 detects that the current display screen displays a given application program or a given interface. In this case, the device 1 determines to display, on the device 2, a control that is associated with the given application program or the given interface. As shown in FIG. 6A, the device 1 displays the video-A playing interface of the video application program. When the user triggers the bullet screen control, the device 1 displays the keyboard control. Then, when the device 1 determines that the keyboard control is displayed in the current application program or on the current interface, the device 1 determines to extend a function of the keyboard control to the device 2.

Figure 6B:
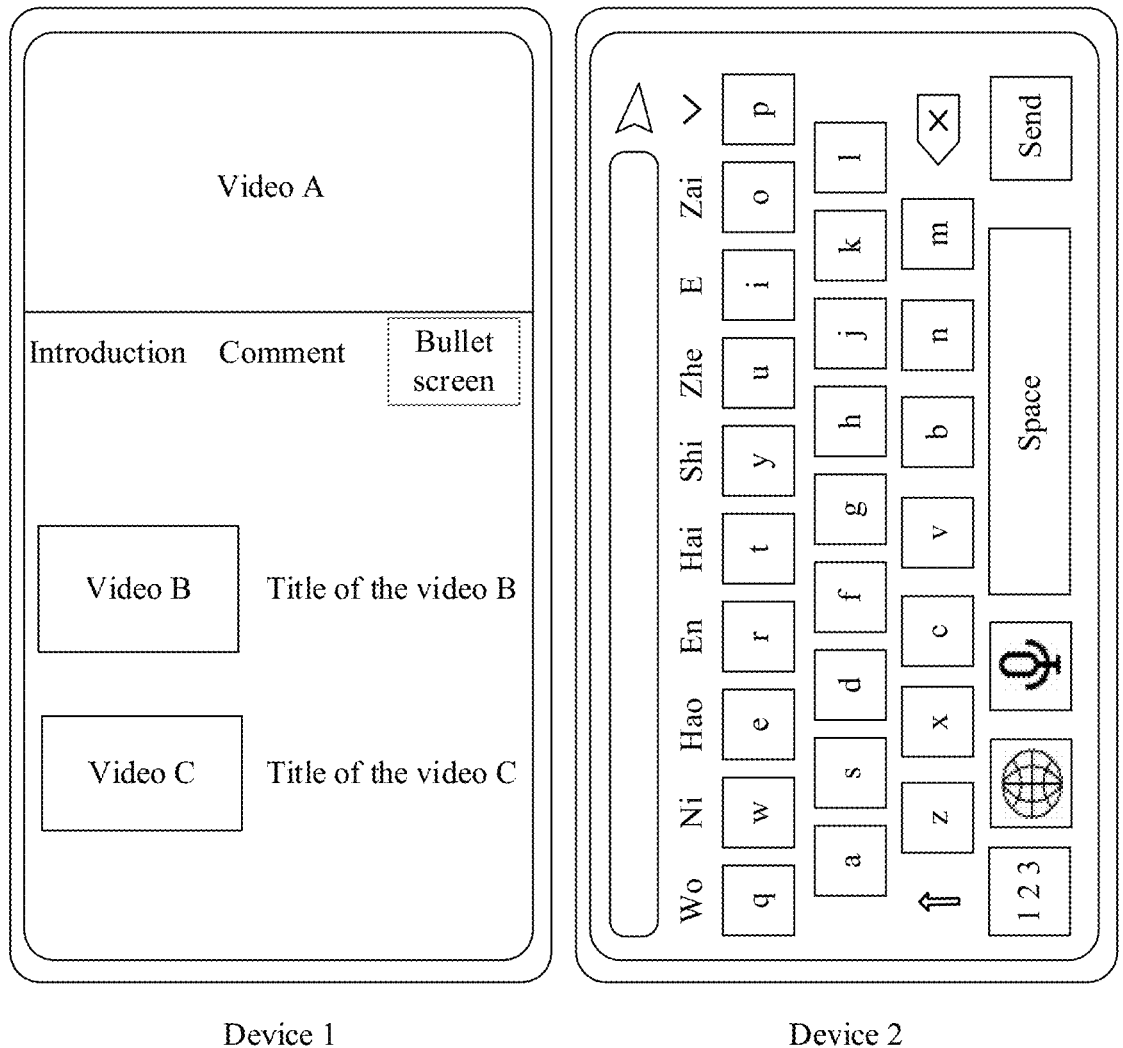

Specifically, the device 1 sends, to the device 2, indication information for displaying the keyboard control. The device 2 displays the keyboard control based on the indication information. As shown in FIG. 6B, the device 2 may display the keyboard control in full screen. Optionally, the device 2 displays the keyboard control in a landscape orientation state. When the user enters information by using the keyboard control of the device 2, the device 2 sends, to the device 1, the information entered by using the keyboard control. The device 1 displays the entered information as a bullet screen on the video-A playing interface. Certainly, when the introduction control and the comment control on the interface of the device 1 are triggered, the device 1 may also extend a corresponding subinterface or control to the device 2.

Figure 6C:
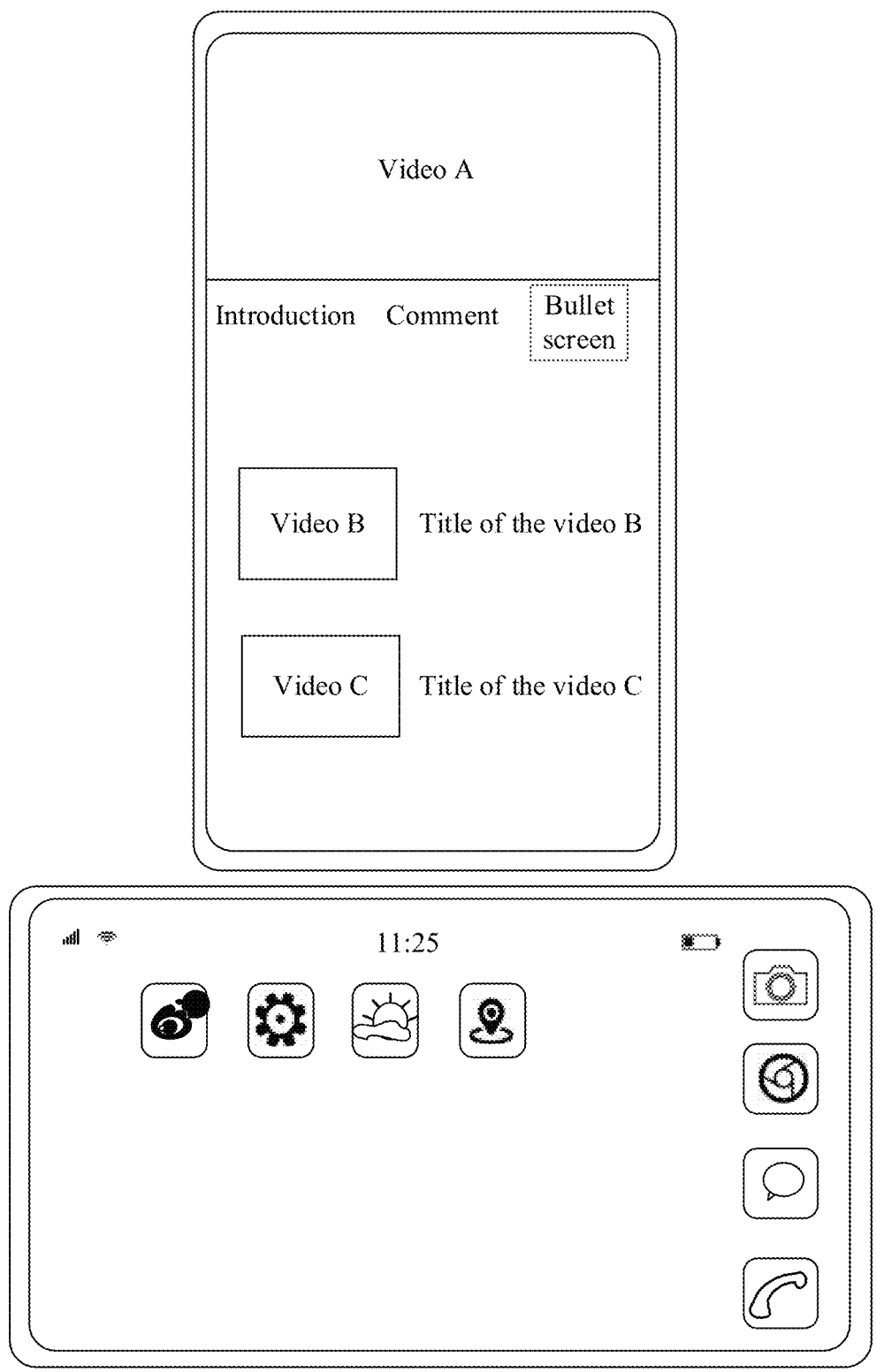
Figure 6D:
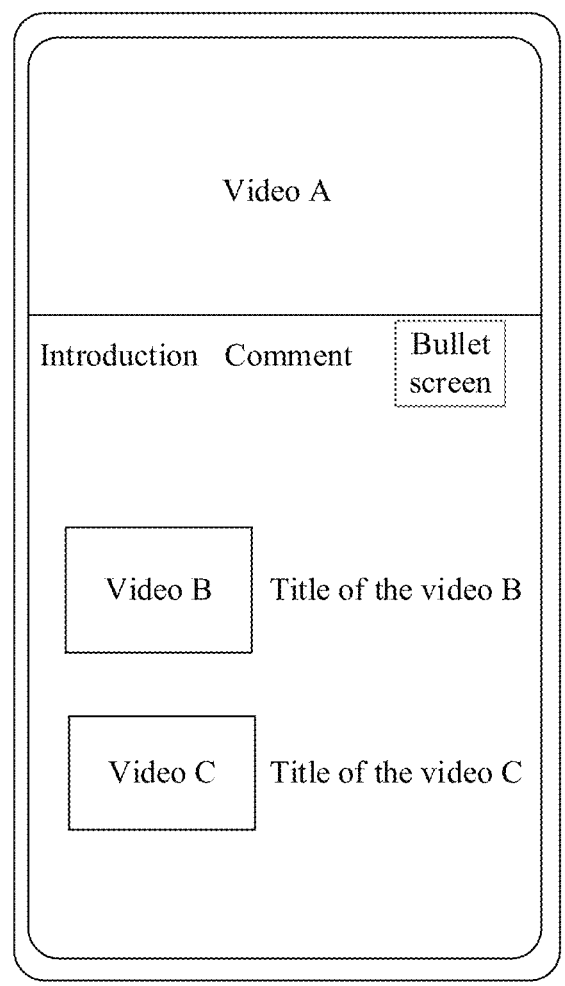
Figure 6D:
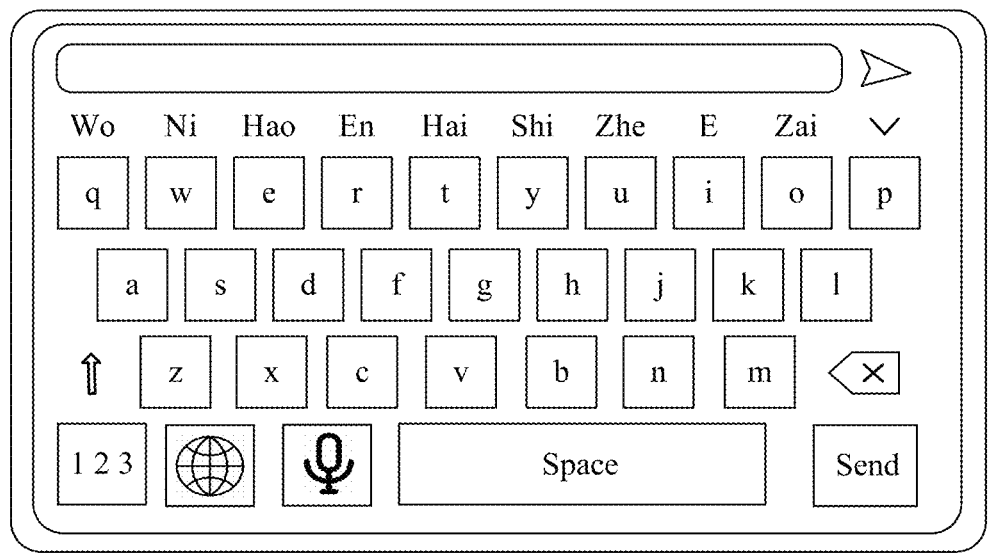

In another possible design, as shown in FIG. 6C and FIG. 6D, when the long side of the device 2 comes into contact with the short side of the device 1 and the device 1 displays the given application program or the given interface, the device 1 sends, to the device 2, indication information for displaying the keyboard control; and the device 2 displays the keyboard control in a landscape orientation state. Alternatively, the device 1 displays the given application program or the given interface, and when the user clicks the bullet screen control, the device 1 sends, to the device 2, indication information for displaying the keyboard control; and the device 2 displays the keyboard control in a landscape orientation state.

Figure 6E:
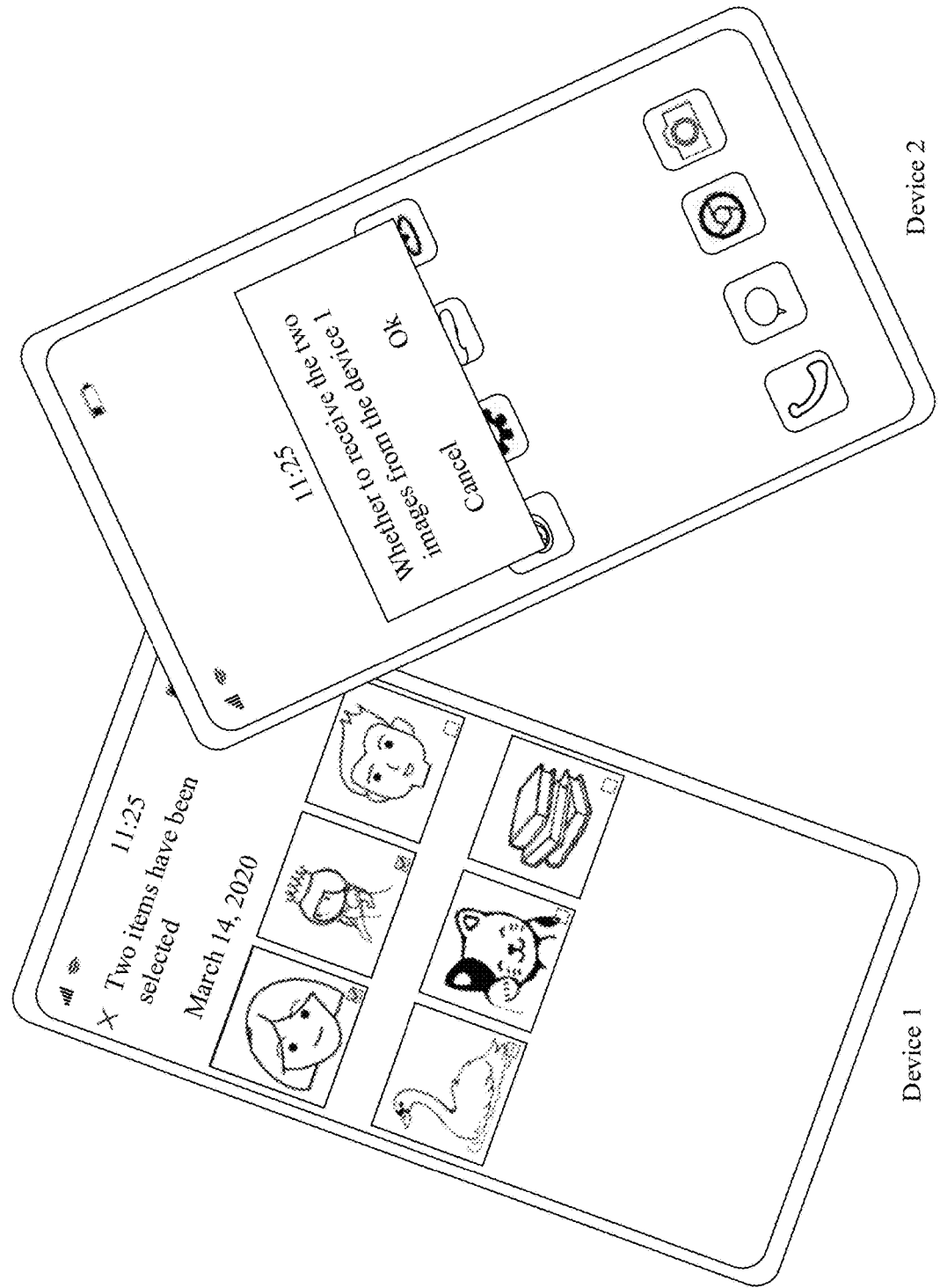
FIG. 6E and FIG. 6F are schematic diagrams of device interaction in Scenario 4 according to an embodiment of this application.

Scenario 4: As shown in FIG. 6E, the device 1 displays a user interface of a gallery application program. The device 2 displays a home screen of a desktop application program. When the device 1 and the device 2 move obliquely toward each other and partial surfaces of the device 1 and the device 2 are stacked, the device 1 determines, based on the content in the display screens of the device 1 and the device 2, that the device 1 is a primary device and the device 2 is an extension device.

As shown in FIG. 6E, when two images in the device 1 are in a selected state, the device 1 sends data of the two images to the device 2. The device 2 displays prompt information indicating whether to receive the two images from the device 1. When receiving a click operation performed by a user on a confirmation control, the device 2 receives the data of the two images sent by the device 1.

Figure 6F:
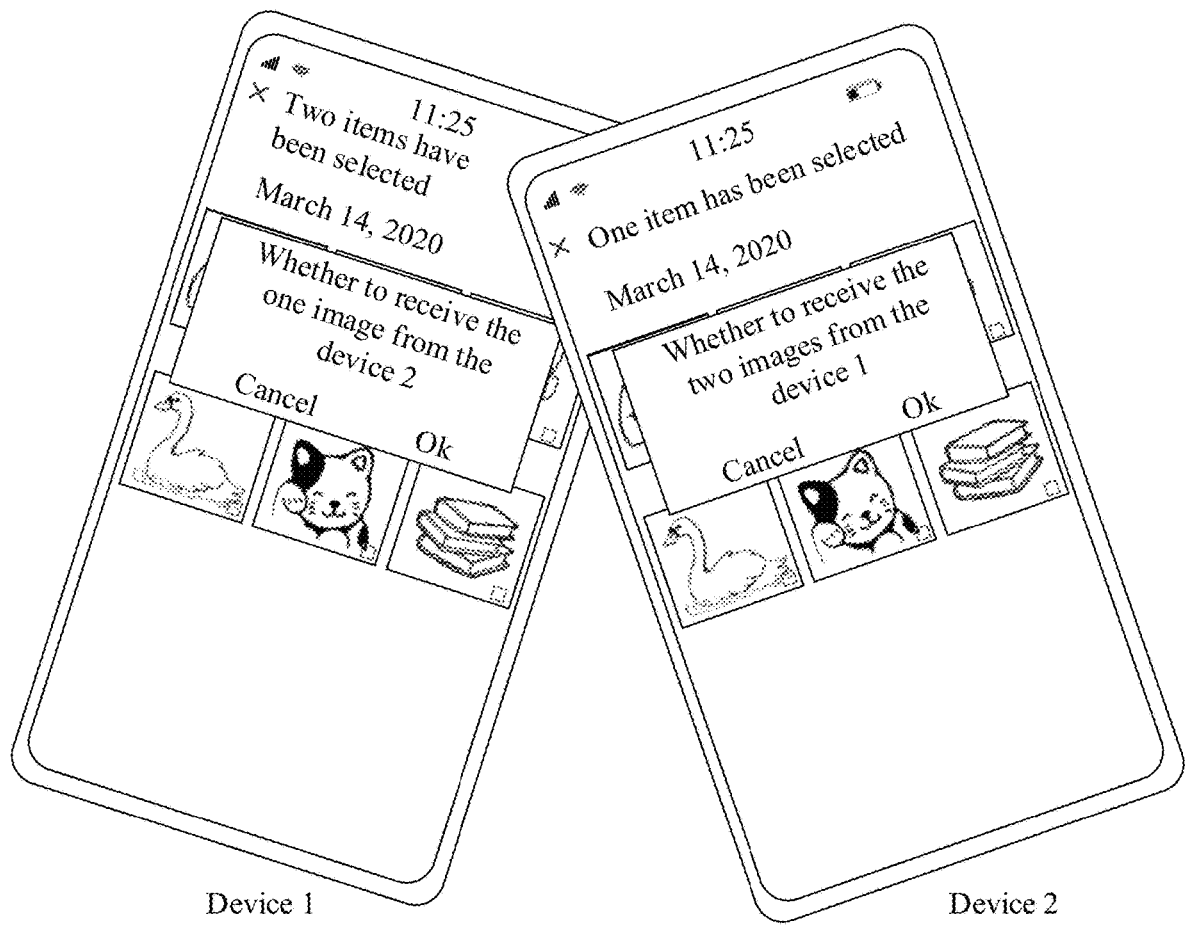

As shown in FIG. 6F, the device 1 displays a user interface of a gallery application program. The device 2 displays a user interface of a gallery application program. Two images in the device 1 are in a selected state. One image in the device 2 is in a selected state. The device 1 and the device 2 perform data exchange based on a relative location posture between the device 1 and the device 2 and content displayed on the interfaces. Optionally, the device 1 may send the two images in the selected state to the device 2, and the device 2 may also send one image in the selected state to the device 1. In some embodiments, as shown in FIG. 6F, the device 1 displays prompt information indicating whether to receive the one image from the device 2, and the device 2 displays prompt information indicating whether to receive the two images from the device 1. After the user triggers confirmation controls on the device 1 and/or the device 2, the device 1 and/or the device 2 receive image data from the other party.

Figure 7A:
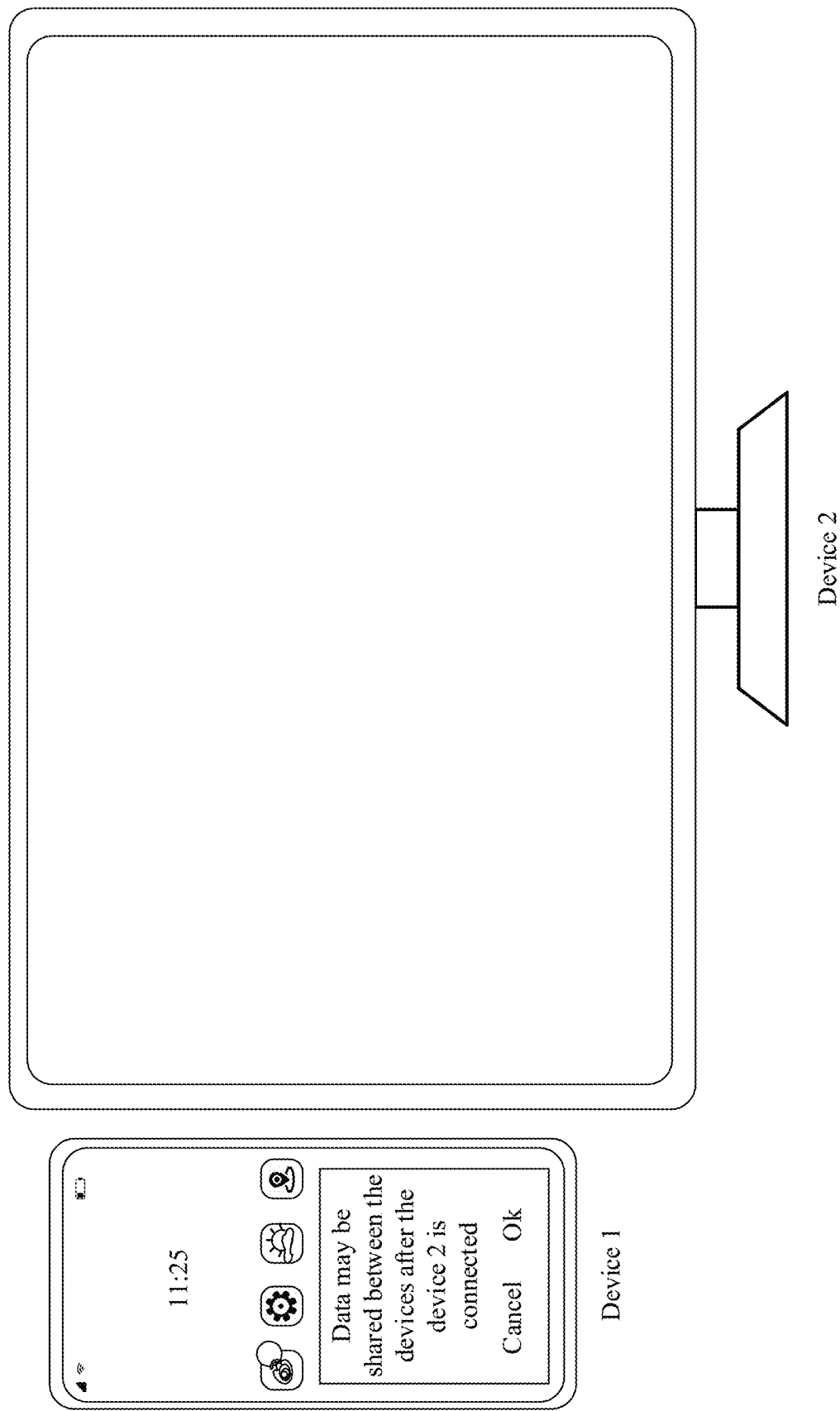
FIG. 7A to FIG. 7G are schematic diagrams of device interaction in Scenario 5 according to an embodiment of this application.
Figure 7B:
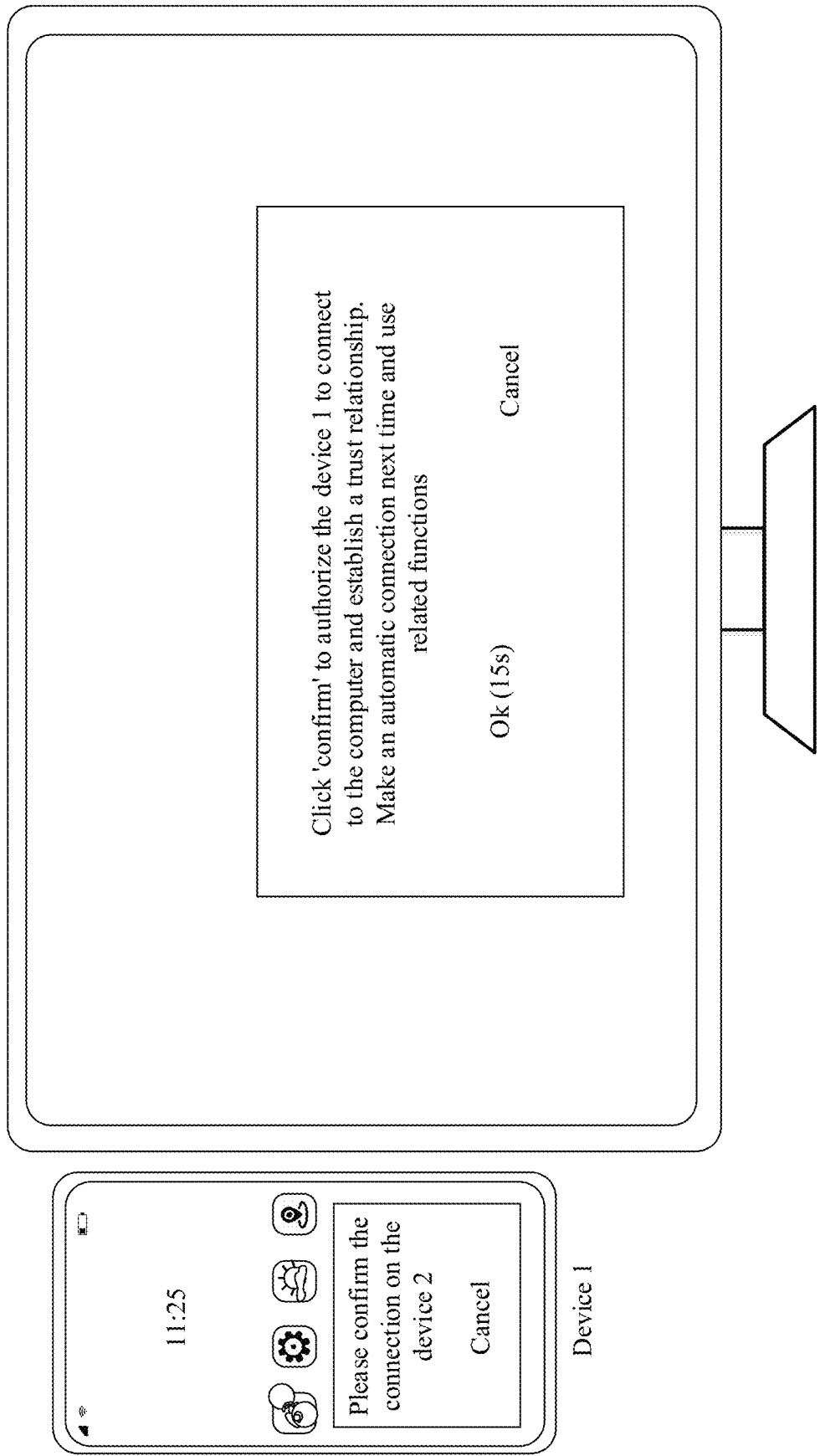

Scenario 5: As shown in FIG. 7A, the device 1 and the device 2 are electronic devices of different types. For example, the device 1 is a mobile phone and the device 2 is a computer. The device 1 displays a first home screen of a desktop application program of the mobile phone. The device 2 displays a second home screen of a desktop application program of the computer. When a long side of the device 1 comes into contact with a short side of the device 2, the device 1 and the device 2 may pop up prompt information indicating whether to establish an association relationship. As shown in FIG. 7A, the device 1 may display a first pop-up box that "data may be shared between the devices after the device 2 is connected". The device 1 detects a click operation on a confirmation control in the first pop-up box. Then, as shown in FIG. 7B, the device 1 may display a second pop-up box that "please confirm the connection on the device 2". In addition, the device 2 displays a third pop-up box that "click 'Ok' to authorize the device 1 to connect to the computer and establish a trust relationship". The third pop-up box may further include prompt information "make an automatic connection next time and use related functions". After detecting a click operation on a confirmation control within a preset time (for example, 15 s), the device 2 sends confirmation information to the device 1. After the device 1 and the device 2 establish the trust relationship, the device 1 and the device may perform interactive services with each other, such as data transmission, screen sharing, and function extension.

Figure 7C:
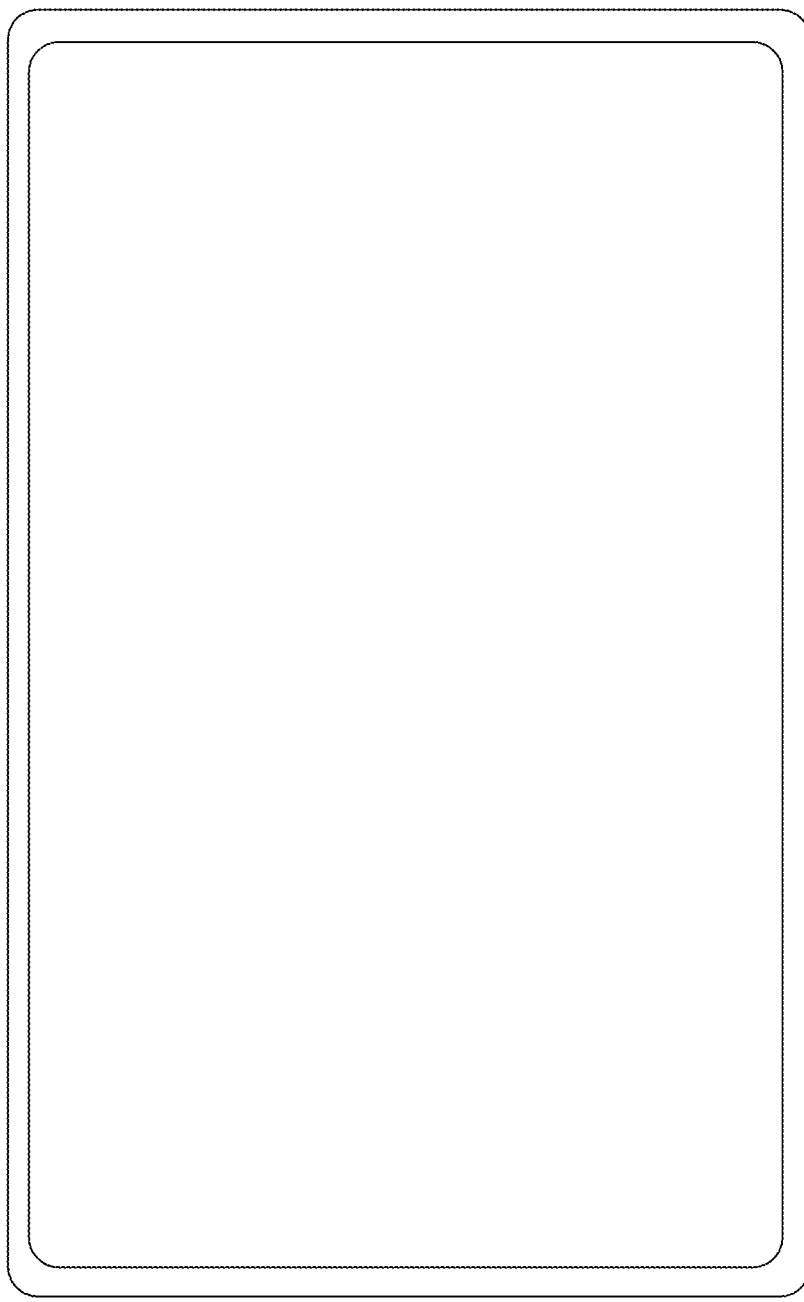

In a specific example, as shown in FIG. 7C, the device 1 and the device 2 determine, based on the device types, the device 2 as a primary device and the device 1 as an extension device. The device 2 obtains information about a space location occupied by a display screen of the device 1. The device 2 determines, as virtual operation space, the space location occupied by the display screen of the device 1. The device 2 extends operation space of an input device of the device 2 to the virtual operation space. In other words, the device 2 may perform operation control on the device 1 by using the input device.

As shown in FIG. 7C, the device 2 detects coordinates and an instruction of a mouse cursor. When detecting that the coordinates of the mouse cursor exceed a display screen region of the device 2, the device 2 determines whether the coordinates of the mouse cursor are located in the virtual operation space region. If the coordinates of the mouse cursor of the device 2 are located in the virtual operation space region, the device 2 sends the coordinates of the mouse cursor and an icon of the mouse cursor to the device 1. The device 1 displays the icon of the mouse cursor. Alternatively, the device 2 may send, to the device 1, indication information including the coordinates of the mouse cursor, so that the device 1 generates and displays the icon of the mouse cursor based on the indication information. When detecting a first instruction for a mouse, for example, when detecting an operation of moving the mouse or clicking the mouse, the device 2 converts the first instruction into a second instruction in the virtual space region. The device 2 sends the second instruction to the device 1. The device 1 moves a location of the mouse cursor and/or performs an operation on data on the device 1 based on the second instruction, for example, performs an operation of selecting an image 31.

Figure 7D:
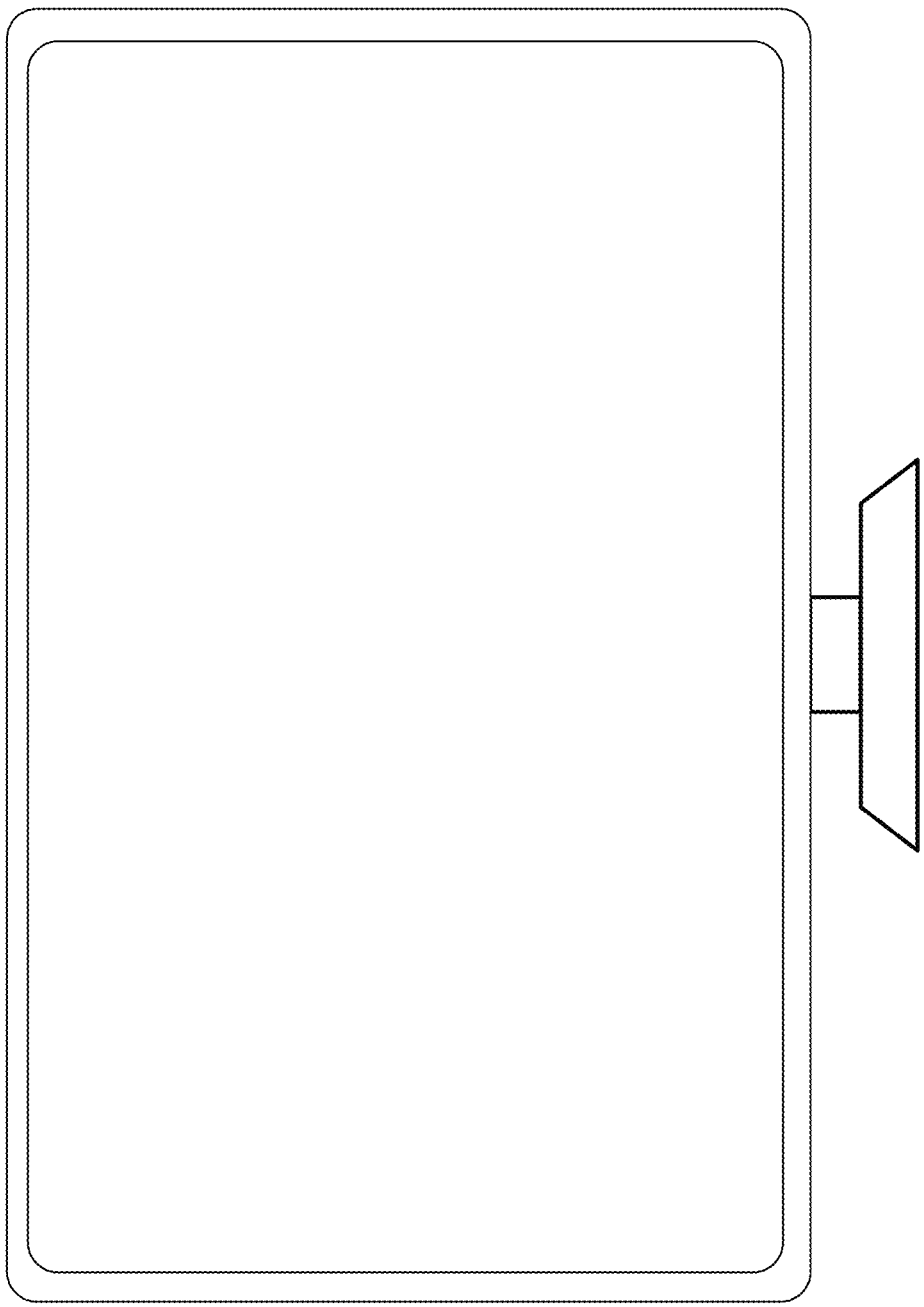
Figure 7E:
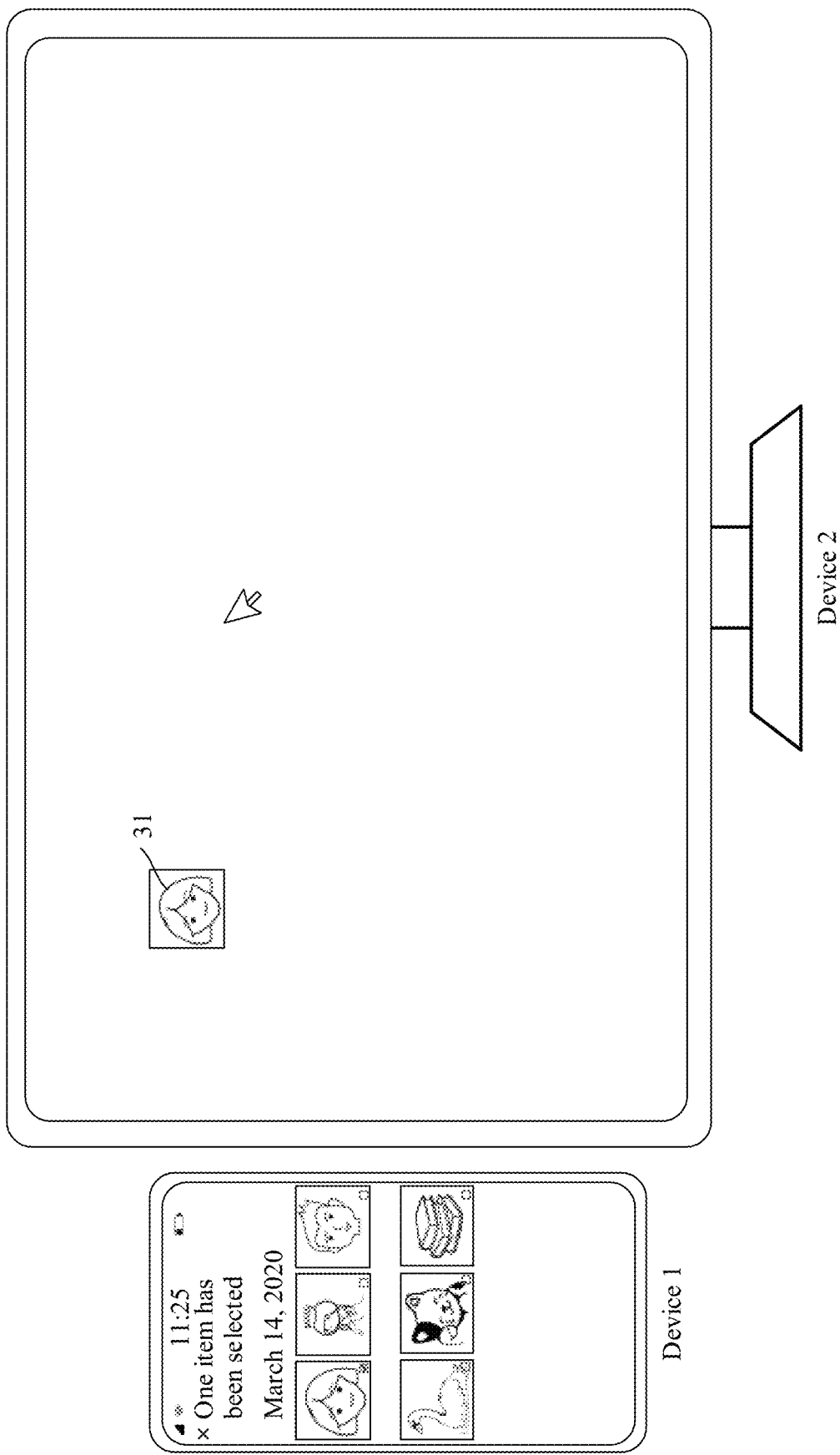

A user may alternatively drag the image 31 by using the mouse. As shown in FIG. 7D, the device 1 displays a thumbnail 301 based on a dragging motion. As shown in FIG. 7E, when the mouse cursor drags the thumbnail 301 to move to the device 2 for release, the device 2 displays an icon of the image 31 or the image 31 on a desktop based on data of the image 31. The device 1 sends the data of the image 31 to the device 2. For example, when detecting that the image 31 is in a selected state, the device 1 sends the image 31 to the device 2.

Figure 7F:
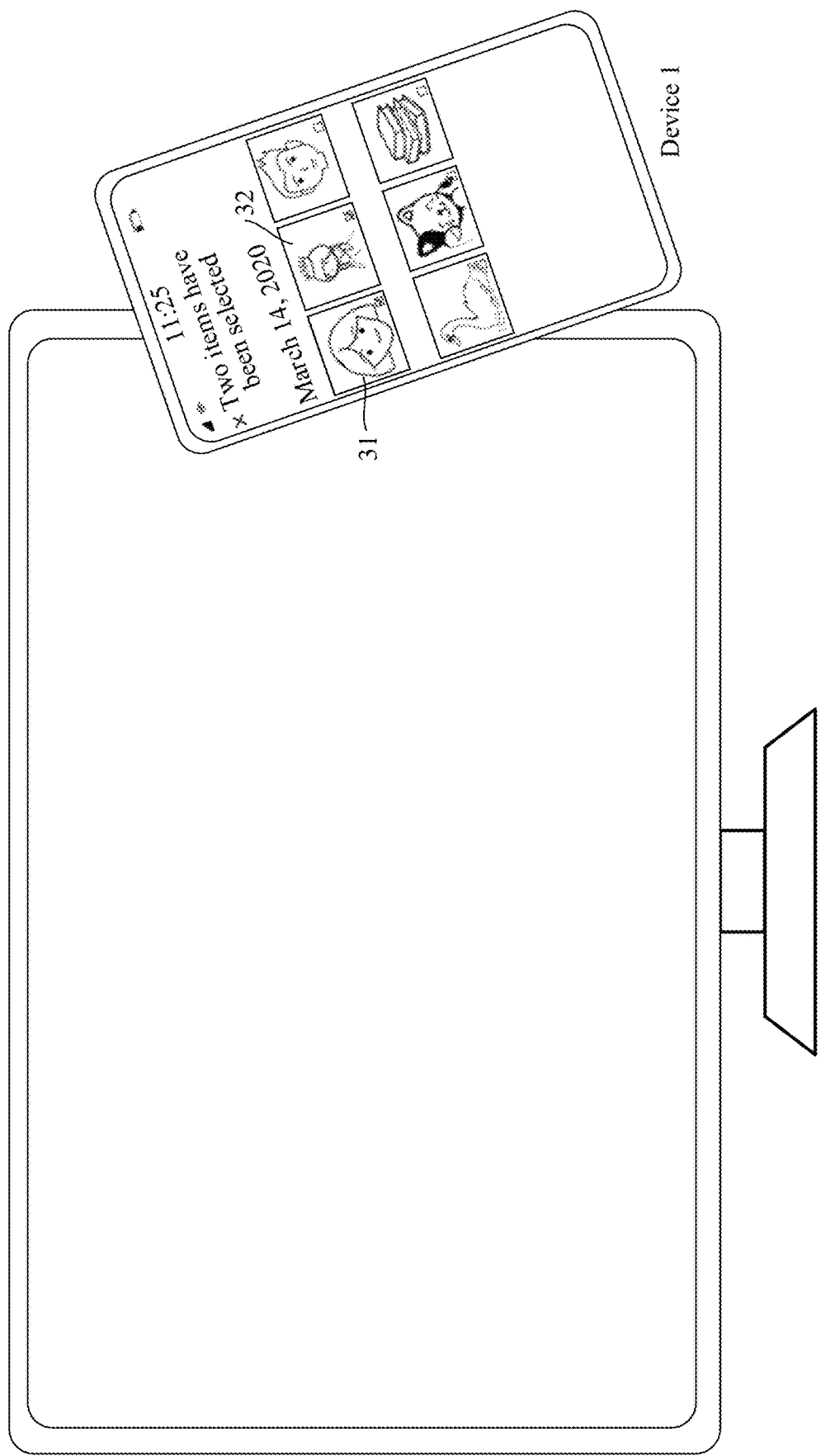
Figure 7G:
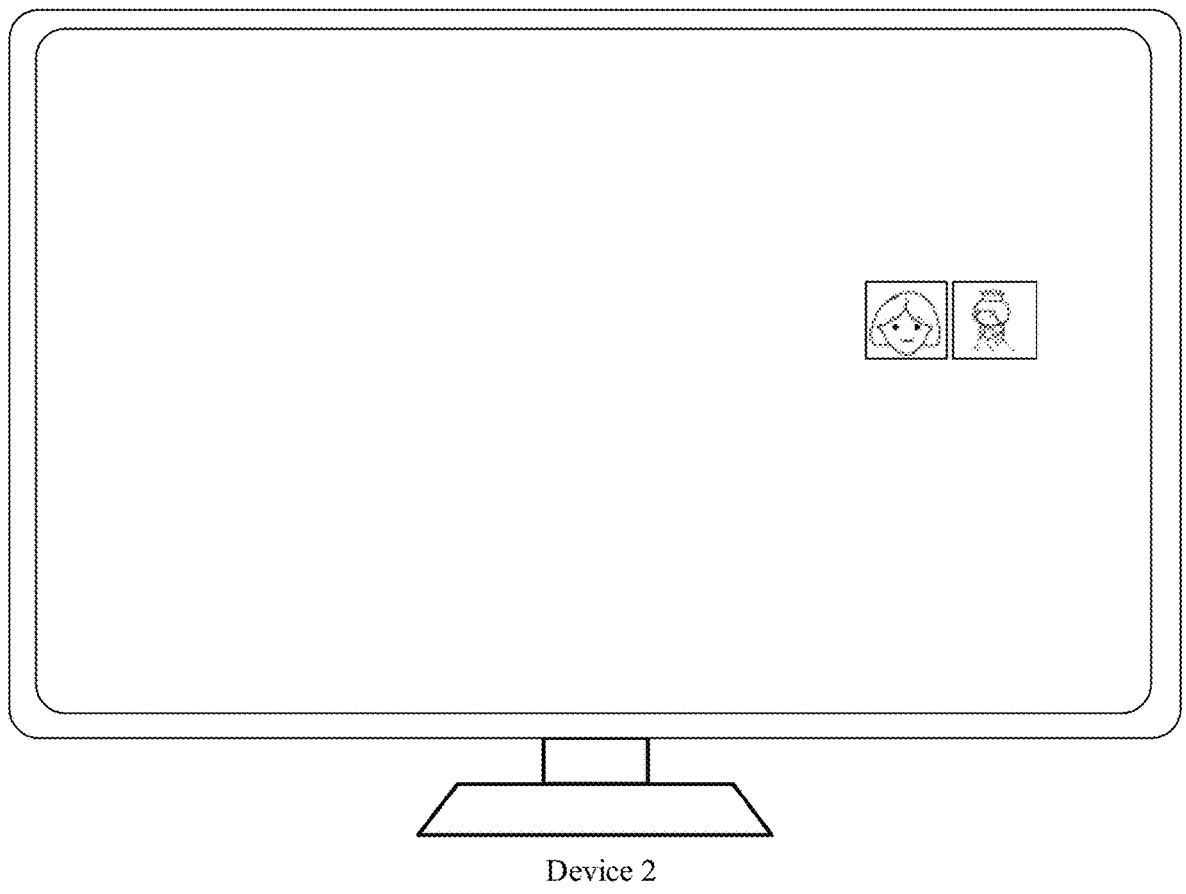

In some embodiments, as shown in FIG. 7F, when the device 1 is stacked on the display screen region of the device at a tilt angle, the device 1 sends data of the selected image 31 and image 32 to the device 2. As shown in FIG. 7G, the device 2 receives the data of the image 31 and image 32 sent by the device 1, and displays icons of the image 31 and image 32 on the desktop.

Figure 8A:
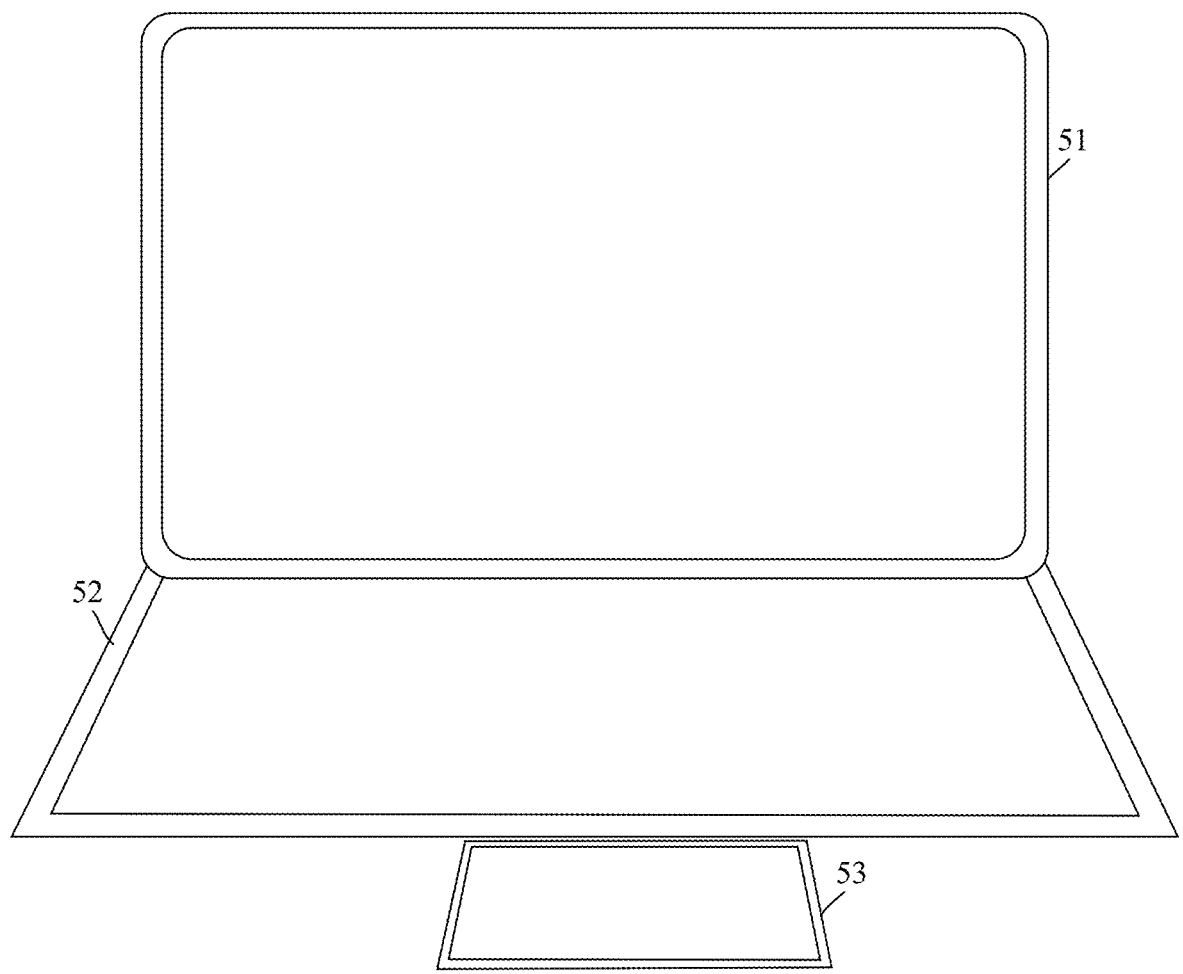
FIG. 8A and FIG. 8B are schematic diagrams of device interaction in Scenario 6 according to an embodiment of this application.
Figure 8B:
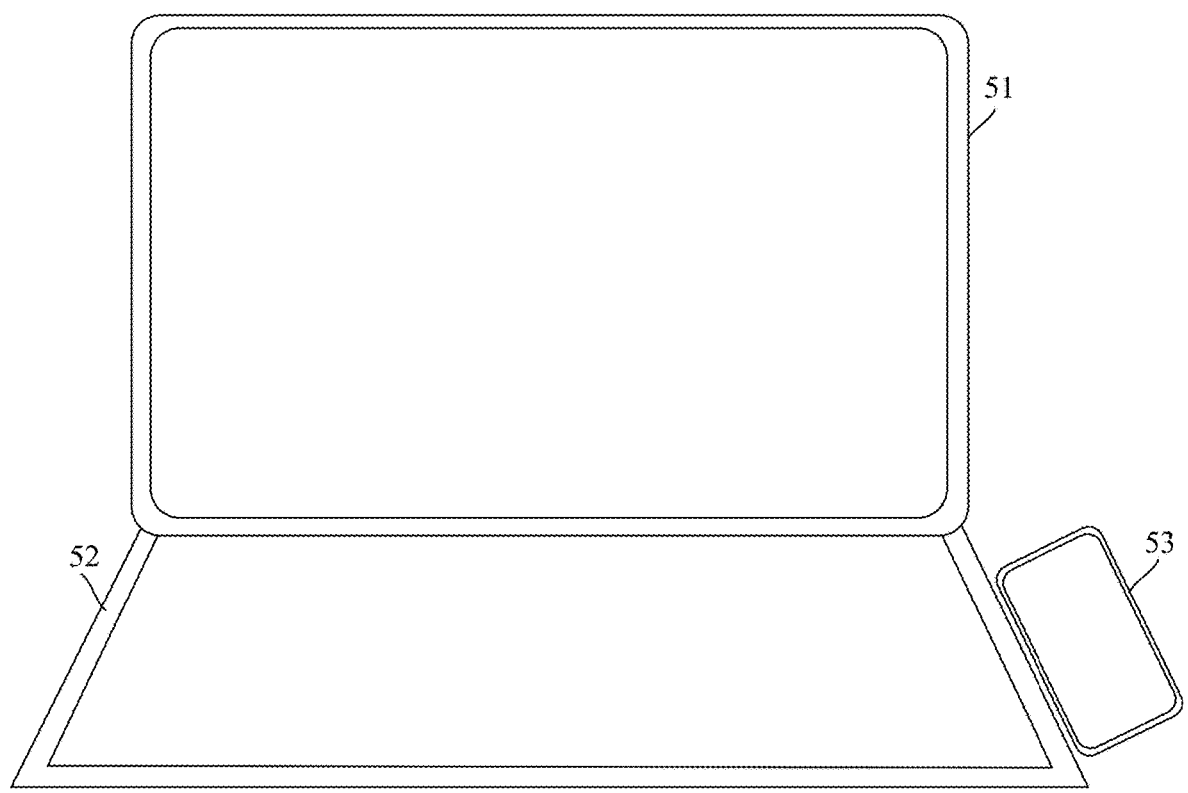

Scenario 6: As shown in FIG. 8A, a tablet computer 51 has an accessory 52. The accessory 52 may be a leather case with a keyboard, a support frame, or the like. A mobile phone 53 comes into contact with a side or a surface of the tablet computer 51 to trigger an interactive service between the devices. In addition, the mobile phone 53 may be in a specific relative location posture with the accessory 52 and trigger an interactive service based on the relative location posture with the accessory 52. As shown in FIG. 8A, when a long side of the mobile phone 53 comes into contact with a long side of the accessory 52, a first interactive service is triggered between the mobile phone 53 and the tablet computer 51. As shown in FIG. 8B, when a long side of the mobile phone 53 comes into contact with a short side of the accessory 52, a second interactive service is triggered between the mobile phone 53 and the tablet computer 51.

Figure 9:
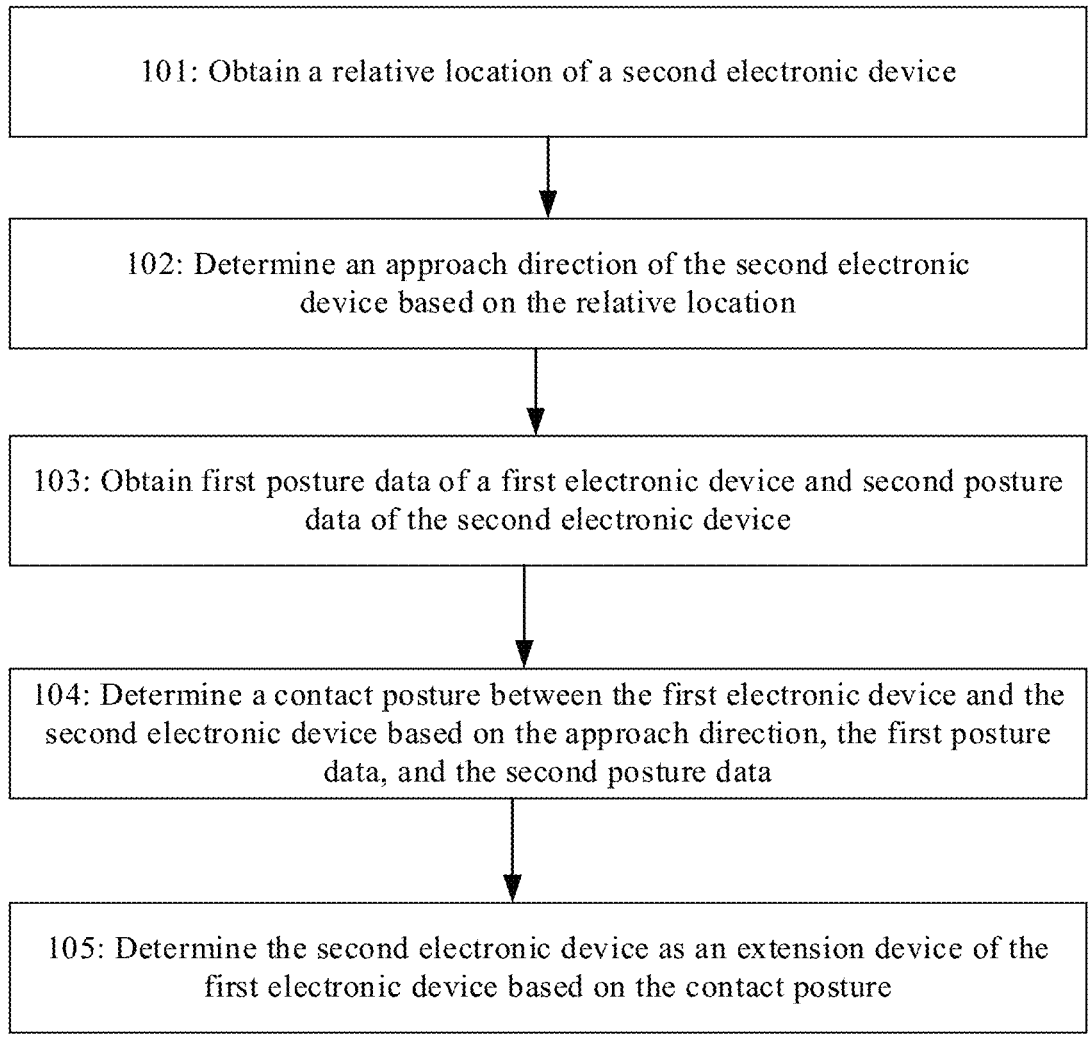
FIG. 9 is a flowchart of a device interaction method according to an embodiment of this application.

Based on the embodiments described above, as shown in FIG. 9, steps of the device interaction method in embodiments of this application may include the following steps.

101: A first electronic device obtains a relative location of a second electronic device.

In some embodiments, the first electronic device may detect location data of the first electronic device or the second electronic device by using a UWB positioning chip or a Bluetooth positioning chip; and determines the relative location of the second electronic device based on the location data. Optionally, the detected location data includes relative locations of the first electronic device and the second electronic device. The first electronic device may directly determine the relative locations based on the data. Optionally, the first electronic device may calculate the relative locations based on intermediate data, such as a distance between the first electronic device and the second electronic device, and a moving speed and a tilt angle of the first electronic device or the second electronic device that are included in the location data.

102: The first electronic device determines an approach direction of the second electronic device based on the relative location.

In some embodiments, the first electronic device may determine the approach direction of the second electronic device based on the relative location determined in step 101. A direction from which the second electronic device approaches the first electronic device may be determined based on the approach direction. In some embodiments, the approach direction of the second electronic device may include the following several cases: The first electronic device keeps still, and the second electronic device moves toward the first electronic device; the second electronic device keeps still, and the first electronic device moves toward the second electronic device; and the first electronic device and the second electronic device move toward each other.

In some embodiments, the approach direction may include: The second electronic device moves toward a direction of the first electronic device from a front of a screen of the first electronic device; and the second electronic device moves toward the direction of the first electronic device from one side of the first electronic device. Other possible approach directions are not enumerated herein.

103: The first electronic device obtains first posture data of the first electronic device and second posture data of the second electronic device.

In some embodiments, the obtaining first posture data includes any one or a combination of the following manners: detecting motion posture data of the first electronic device by using a gyro sensor; and detecting acceleration data of the first electronic device by using an acceleration sensor. Based on the acceleration data, a landscape/portrait orientation status of the first electronic device may be determined, a speed at which the first electronic device moves toward the second electronic device may be determined, a tilt angle of the first electronic device may be determined, or the like.

In some embodiments, the first electronic device receives the second posture data sent by the second electronic device, where the second posture data includes motion posture data, acceleration data, or landscape/portrait orientation status data of the second electronic device.

Correspondingly, a landscape/portrait orientation status of the second electronic device may be determined based on the acceleration data or the landscape/portrait orientation status data in the second posture data; or a speed at which the second electronic device moves toward the first electronic device, a tilt angle of the second electronic device, or the like may be determined based on the acceleration data in the second posture data.

In some embodiments, the first posture data includes a first contact signal and the second posture data includes a second contact signal. Correspondingly, sides or surfaces on which the first electronic device is in contact with the second electronic device may be determined based on the first contact signal and the second contact signal.

In some embodiments, a manner in which the first electronic device obtains the first contact signal may include: collecting a pressure signal by using a pressure sensor disposed around the first electronic device. A contact location of the first electronic device is determined based on the pressure signal. For example, a side or a surface of the first electronic device is in contact with the second electronic device.

In some embodiments, the first electronic device may determine, through calculation based on the distance between the first electronic device and the second electronic device, the moving speeds, approach directions, sizes of the devices, and the like, whether the first electronic device and the second electronic device come into contact with each other; and determine data such as contact locations based on the calculation result.

In some embodiments, the first electronic device may collect sound by using a microphone; determine, by using a sound signal, whether the first electronic device and the second electronic device come into contact with each other; and determine the contact locations and the like based on magnitudes of sound signals collected by a plurality of microphones.

104: The first electronic device determines a contact posture between the first electronic device and the second electronic device based on the approach direction, the first posture data, and the second posture data.

In some embodiments, the contact posture may be a posture when the distance between the first electronic device and the second electronic device is less than a first threshold; or may be a posture when the first electronic device and the second electronic device are in contact with each other.

In some embodiments, the posture between the first electronic device and the second electronic device may include motion directions of the first electronic device and the second electronic device. For example, the first electronic device comes into contact with the second electronic device after moving toward the second electronic device, the second electronic device comes into contact with the first electronic device after moving toward the first electronic device, or the first electronic device and the second electronic device come into contact with each other after moving toward each other.

In some embodiments, the contact posture between the first electronic device and the second electronic device may be determined based on the approach direction determined based on a variety of posture data, the first posture data and the second posture data that are obtained in step 103.

In some embodiments, the contact posture between the first electronic device and the second electronic device may be determined based on the approach direction determined based on a variety of posture data, the first posture data and the second posture data that are obtained in step 103.

The contact posture between the first electronic device and the second electronic device includes any one of the following:

a first long side of the first electronic device is in contact with a second long side of the second electronic device;

the first long side of the first electronic device is in contact with a first short side of the second electronic device;

a second short side of the first electronic device is in contact with a third long side of the second electronic device;

the second short side of the first electronic device is in contact with a third short side of the second electronic device;

a first surface of the first electronic device is in contact with a second surface of the second electronic device; and a preset side or surface of the second electronic device is in contact with an accessory of the first electronic device.

Specifically, for the contact posture between the first electronic device and the second electronic device, refer to FIG. 2A to FIG. 2D, FIG. 4A, FIG. 5A, FIG. 6A, FIG. 7A, FIG. 8A, and FIG. 8B.

105: The first electronic device determines the second electronic device as an extension device of the first electronic device based on the contact posture.

In some embodiments, as shown in FIG. 5A to FIG. 5E, if the first electronic device and the second electronic device are devices of a same type, a device that proactively comes into contact may be determined as a primary device from the first electronic device and the second electronic device, and a device that is passively in contact may be determined as an extension device from the first electronic device and the second electronic device. To be specific, when the contact posture is that the first electronic device proactively comes into contact with the second electronic device, the first electronic device is the primary device, and the second electronic device is the extension device. In this embodiment of this application, whether the two electronic devices are of a same type may be set depending on an actual requirement. For example, specified types include a mobile phone type, a computer type, and a household device type. When the first electronic device is of a mobile phone type and the second electronic device is of a mobile phone type, the types are the same. When the first electronic device is of a mobile phone type and the second electronic device is of a computer type, the types are different. In some other embodiments, specified types may alternatively include a mobile phone 1 type, a mobile phone 2 type, a computer 1 type, and a computer 2 type. If the first electronic device is of a mobile phone 1 type and the second electronic device is of a mobile phone 2 type, it may be considered that the first electronic device and the second electronic device are of different types. The foregoing descriptions are only examples, and a specific division manner may be set depending on an actual requirement.

In some embodiments, as shown in FIG. 4A to FIG. 4G and FIG. 6A to FIG. 6D, a device that proactively comes into contact may be determined as an extension device from the first electronic device and the second electronic device, and a device that is passively in contact may be determined as a primary device from the first electronic device and the second electronic device. To be specific, when the contact posture is that the first electronic device is passively in contact with the second electronic device, the first electronic device is the primary device, and the second electronic device is the extension device.

In some embodiments, if the first electronic device and the second electronic device come into contact with each other after moving toward each other, as shown in FIG. 6E and FIG. 6F, the first electronic device and/or the second electronic device may display first prompt information, where the first prompt information is used to prompt a user to determine the primary device from the first device or the second device.

In some embodiments, as shown in FIG. 7A to FIG. 7G, if the first electronic device and the second electronic device are devices of different types, a device that is of a first device type may be determined as a primary device from the first electronic device and the second electronic device, and the other device may be determined as the extension device. For example, a tablet computer, a computer, a notebook computer, or a television set is considered as a primary device by default. A mobile phone or a wearable device is considered as an extension device by default. A specific setting manner may be set depending on an actual requirement.

In some embodiments, after the second electronic device is determined as the extension device of the first electronic device, display screens of the first electronic device and the second electronic device may be determined as a combined screen based on display screen information of the first electronic device and the second electronic device. Optionally, the primary device may determine the display screens of the first electronic device and the second electronic device as the combined screen based on the display screen information of the first electronic device and the second electronic device. In an example, the first electronic device is the primary device.

In some embodiments, after the first electronic device determines the display screens of the first electronic device and the second electronic device as the combined screen based on the display screen information of the first electronic device and the second electronic device, the first electronic device may send first data on the first electronic device to the second electronic device based on the combined screen; or display the first data on the combined screen; or determine a region of the combined screen as an operation region.

In some embodiments, the first electronic device and the second electronic device may transmit data with each other. As shown in FIG. 4A to FIG. 4G, after detecting a first gesture motion performed on the first data, the first electronic device may display a movement track of the first data on the combined screen based on the first gesture motion; and transmit the first data from the first electronic device to the second electronic device based on the first gesture motion. Alternatively, as shown in FIG. 6E and FIG. 6F and FIG. 7F and FIG. 7G, the primary device may transmit data to the extension device based on the prompt information. Optionally, the primary device may also receive data sent by the extension device.

In some embodiments, the first electronic device may display the first data on the combined screen. Optionally, the first data may be an image, an electronic document, a user interface of an application program, or the like. As shown in FIG. 5A to FIG. 5E, the first electronic device detects a second gesture motion or detects a third gesture motion;

receives fourth gesture motion data sent by the second electronic device; determines a fourth gesture motion based on the fourth gesture motion data; and if a combined motion of the third gesture motion and the fourth gesture motion is a specified motion, determines to display the first data on the combined screen.

In some embodiments, as shown in FIG. 5C, a thumbnail of the first data is displayed on the display screen of the first electronic device or the combined screen based on the second gesture motion or the combined motion.

In some embodiments, as shown in FIG. 5A to FIG. 5E, when the first data is a user interface displayed on the first electronic device, the displaying the first data on the combined screen may include: dividing the user interface into a first subinterface and a second subinterface; displaying the first subinterface on the display screen of the first electronic device; and sending data of the second subinterface to the second electronic device to display the second subinterface on the second electronic device.

In some embodiments, the first user interface is displayed on the first electronic device; and the displaying the first data on the combined screen includes: detecting a first operation performed on a first control on the first user interface; and sending, to the second electronic device in response to the first operation, indication information for displaying a second control or displaying a first subinterface. The second control is a control associated with the first control. For example, a keyboard control is popped up after a bullet screen button is clicked. As shown in FIG. 6A to FIG. 6D, a comment subinterface, the keyboard control, and the like on the video playing interface may be displayed on the second electronic device.

In some embodiments, as shown in FIG. 7A to FIG. 7E, the determining, by the first electronic device, a region of the combined screen as an operation region includes: detecting a first input instruction, and determining that the first input instruction is performed on a region in which the display screen of the second electronic device is located; sending a second input instruction to the second electronic device based on the first input instruction, so that the second electronic device responds based on the second input instruction; and receiving a response result that is generated by the second electronic device based on the second input instruction. As shown in FIG. 7A to FIG. 7G, the extension device may be used as an extension device of the operation region of the primary device. The primary device may perform an operation on the extension device.

As shown in FIG. 8A and FIG. 8B, the second electronic device may further come into contact with the accessory of the first electronic device. When the contact posture satisfies a specific condition, the first electronic device and the second electronic device may interact with each other, as shown in FIG. 4A to FIG. 7G.

The foregoing descriptions are merely specific implementations of this application. Any variation or replacement readily figured out by a person skilled in the art within the technical scope disclosed in this application shall fall within the protection scope of this application. The protection scope of this application shall be subject to the protection scope of the claims.

What is claimed is:

1. A method, comprising:
   determining, by a first electronic device, an interactive service between the first electronic device and a second electronic device, the first electronic device and the second electronic device being separate devices;
   when the interactive service is a first type:
   in response to a drag operation on a first object on a first interface of a first application running in the first electronic device, sending, by the first electronic device, data of the first object to the second electronic device to display the first object on a second interface of a second application running in the second electronic device, wherein the first application and the second application are different types of applications; and
   when the interactive service is a second type:
   displaying, by the first electronic device, a first subinterface of a third application running in the first electronic device; and
   sending, by the first electronic device, second data of a second subinterface of the third application to the second electronic device to display the second subinterface on the second electronic device.

2. The method according to claim 1, wherein the second electronic device is an extension screen of the first electronic device based on the interactive service being the second type.

3. The method according to claim 1, further comprising:
   before the determining the interactive service between the first electronic device and the second electronic device:
   obtaining, by the first electronic device, a relative location of the second electronic device;
   determining, by the first electronic device, an approach direction of the second electronic device based on the relative location;
   obtaining, by the first electronic device, first posture data of the first electronic device and second posture data of the second electronic device;
   determining, by the first electronic device, a contact posture between the first electronic device and the second electronic device based on the approach direction, the first posture data, and the second posture data; and
   determining, by the first electronic device, the second electronic device as an extension device of the first electronic device based on the contact posture.

4. The method according to claim 3, wherein the obtaining the relative location of the second electronic device comprises:
   detecting, by the first electronic device, location data of the first electronic device or the second electronic device by using an ultra-wideband (UWB) positioning chip or a Bluetooth positioning chip; and
   determining, by the first electronic device, the relative location of the second electronic device based on the location data.

5. The method according to claim 3, wherein the obtaining the first posture data of the first electronic device comprises at least one of:
   detecting, by the first electronic device, motion posture data of the first electronic device by using a gyro sensor; or
   detecting, by the first electronic device, acceleration data of the first electronic device by using an acceleration sensor.

6. The method according to claim 5, wherein the obtaining the second posture data of the second electronic device comprises:
   receiving, by the first electronic device, the second posture data sent by the second electronic device, wherein the second posture data comprises second motion posture data, second acceleration data, or landscape or portrait orientation status data of the second electronic device.

7. The method according to claim 3, wherein the first posture data comprises a first contact signal, wherein the second posture data comprises a second contact signal, and
wherein the determining the contact posture between the first electronic device and the second electronic device based on the approach direction, the first posture data, and the second posture data comprises:
determining, by the first electronic device based on the first contact signal and the second contact signal, sides or surfaces on which the first electronic device is in contact with the second electronic device.

8. The method according to claim 3, wherein the first posture data comprises first acceleration data, and the method further comprises:
based on the first acceleration data, determining a landscape or portrait orientation status of the first electronic device, determining a speed at which the first electronic device moves toward the second electronic device, or determining a tilt angle of the first electronic device.

9. The method according to claim 3, wherein the second posture data comprises second acceleration data or landscape or portrait orientation status data, and the method further comprises:
determining, by the first electronic device, a landscape or portrait orientation status of the second electronic device based on the second acceleration data or the landscape or portrait orientation status data; or
determining, by the first electronic device, a speed at which the second electronic device moves toward the first electronic device or a tilt angle of the second electronic device based on the second acceleration data.

10. The method according to claim 3, wherein the contact posture between the first electronic device and the second electronic device comprises at least one of:
a first long side of the first electronic device is in contact with a second long side of the second electronic device,
the first long side of the first electronic device is in contact with a first short side of the second electronic device,
a second short side of the first electronic device is in contact with a third long side of the second electronic device,
the second short side of the first electronic device is in contact with a third short side of the second electronic device,
a first surface of the first electronic device is in contact with a second surface of the second electronic device, or
a preset side or surface of the second electronic device is in contact with an accessory of the first electronic device.

11. A first electronic device, comprising:
one or more processors;
a memory; and
one or more computer programs, wherein the one or more computer programs are stored in the memory, the one or more computer programs comprise instructions, and when the instructions are executed by the first electronic device, the first electronic device is enabled to perform operations including:
determining an interactive service between the first electronic device and a second electronic device, the first electronic device and the second electronic device being separate devices;
when the interactive service is a first type:
in response to a drag operation on a first object on a first interface of a first application running in the first electronic device, sending data of the first object to the second electronic device to display the first object on a second interface of a second application running in the second electronic device, wherein the first application and the second application are different types of applications; and
when the interactive service is a second type:
displaying a first subinterface of a third application running in the first electronic device; and
sending second data of a second subinterface of the third application to the second electronic device to display the second subinterface on the second electronic device.

12. The first electronic device according to claim 11, wherein the second electronic device is an extension screen of the first electronic device based on the interactive service being the second type.

13. The first electronic device according to claim 11, the operations further comprising:
before the determining the interactive service between the first electronic device and the second electronic device:
obtaining a relative location of the second electronic device;
determining an approach direction of the second electronic device based on the relative location;
obtaining first posture data of the first electronic device and second posture data of the second electronic device;
determining a contact posture between the first electronic device and the second electronic device based on the approach direction, the first posture data, and the second posture data; and
determining the second electronic device as an extension device of the first electronic device based on the contact posture.

14. The first electronic device according to claim 13, wherein the obtaining the relative location of the second electronic device comprises:
detecting location data of the first electronic device or the second electronic device by using an ultra-wideband (UWB) positioning chip or a Bluetooth positioning chip; and
determining the relative location of the second electronic device based on the location data.

15. The first electronic device according to claim 13, wherein the obtaining the first posture data of the first electronic device comprises:
detecting motion posture data of the first electronic device by using a gyro sensor; or
detecting acceleration data of the first electronic device by using an acceleration sensor.

16. The first electronic device according to claim 15, wherein the obtaining the second posture data of the second electronic device comprises:
receiving the second posture data sent by the second electronic device, wherein the second posture data comprises second motion posture data, second acceleration data, or landscape or portrait orientation status data of the second electronic device.

17. The first electronic device according to claim 13, wherein the first posture data comprises a first contact signal, wherein the second posture data comprises a second contact signal, and wherein the determining the contact posture between the first electronic device and the second electronic device based on the approach direction, the first posture data, and the second posture data comprises:
  determining, based on the first contact signal and the second contact signal, sides or surfaces on which the first electronic device is in contact with the second electronic device.

18. The first electronic device according to claim 13, wherein the first posture data comprises first acceleration data, and the operations further comprising:
  based on the first acceleration data, determining a landscape or portrait orientation status of the first electronic device, determining a speed at which the first electronic device moves toward the second electronic device, or determining a tilt angle of the first electronic device.

19. The first electronic device according to claim 13, wherein the second posture data comprises second acceleration data or landscape or portrait orientation status data, and the operations further comprising:
  determining a landscape or portrait orientation status of the second electronic device based on the second acceleration data or the landscape or portrait orientation status data; or
  determining a speed at which the second electronic device moves toward the first electronic device or a tilt angle of the second electronic device based on the second acceleration data.

20. The first electronic device according to claim 13, wherein the contact posture between the first electronic device and the second electronic device comprises at least one of:
  a first long side of the first electronic device is in contact with a second long side of the second electronic device,
  the first long side of the first electronic device is in contact with a first short side of the second electronic device,
  a second short side of the first electronic device is in contact with a third long side of the second electronic device,
  the second short side of the first electronic device is in contact with a third short side of the second electronic device,
  a first surface of the first electronic device is in contact with a second surface of the second electronic device, or
  a preset side or surface of the second electronic device is in contact with an accessory of the first electronic device.

* * * * *

UNITED STATES PATENT AND TRADEMARK OFFICE
CERTIFICATE OF CORRECTION

PATENT NO. : 12,159,078 B2
APPLICATION NO. : 18/040494
DATED : December 3, 2024
INVENTOR(S) : Xu et al.

Page 1 of 1

It is certified that error appears in the above-identified patent and that said Letters Patent is hereby corrected as shown below:

In the Specification

In Column 4, Line 55, after "subinterface;" delete "and".

In Column 27, Line 47, delete "device I" and insert -- device 1 --.

In Column 30, Lines 6-7, delete "15 s)," and insert -- 15s), --.

Signed and Sealed this
Seventh Day of January, 2025

Derrick Brent
*Acting Director of the United States Patent and Trademark Office*